(12) United States Patent
Maruyama et al.

(10) Patent No.: US 11,745,754 B2
(45) Date of Patent: *Sep. 5, 2023

(54) ATTENTION CALLING SYSTEM AND ATTENTION CALLING METHOD

(71) Applicant: HONDA MOTOR CO., LTD., Tokyo (JP)

(72) Inventors: Masaki Maruyama, Wako (JP); Toshiaki Seo, Wako (JP); Yuya Kishimoto, Wako (JP); Minoru Higuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/677,626

(22) Filed: Feb. 22, 2022

(65) Prior Publication Data

US 2022/0289226 A1  Sep. 15, 2022

(30) Foreign Application Priority Data

Mar. 12, 2021 (JP) ................. 2021-040550

(51) Int. Cl.
  *B60W 50/14* (2020.01)
  *B60K 35/00* (2006.01)
  *B60W 40/08* (2012.01)
  *B60W 30/095* (2012.01)

(52) U.S. Cl.
  CPC ............ *B60W 50/14* (2013.01); *B60K 35/00* (2013.01); *B60W 30/0956* (2013.01); *B60W 40/08* (2013.01); *B60K 2370/157* (2019.05); *B60K 2370/178* (2019.05); *B60K 2370/188* (2019.05); *B60K 2370/194* (2019.05); *B60K 2370/334* (2019.05); *B60K 2370/785* (2019.05); *B60W 2050/143* (2013.01); *B60W 2050/146* (2013.01)

(58) Field of Classification Search
  CPC .. B60W 50/14; B60W 30/0956; B60W 40/08; B60W 2540/225; B60W 2540/229; B60W 2050/146; G06V 20/597; B60K 35/00; B60K 2370/194; B60K 2370/188; B60K 2370/334; B60K 2370/785
  See application file for complete search history.

(56) References Cited

U.S. PATENT DOCUMENTS

| 7,557,691 | B2 * | 7/2009 | Iwama | G01S 11/12 340/436 |
| 9,878,667 | B2 * | 1/2018 | Iguchi | G02B 27/01 |
| 10,000,153 | B1 * | 6/2018 | Misu | B60R 1/00 |
| 10,139,829 | B1 * | 11/2018 | Mariet | G08G 1/0962 |
| 2016/0052394 | A1 * | 2/2016 | Yamada | G01C 21/365 701/93 |

(Continued)

FOREIGN PATENT DOCUMENTS

| EP | 4049877 A1 * | 8/2022 |
| JP | 2017-021546 A | 1/2017 |

*Primary Examiner* — Chico A Foxx
(74) *Attorney, Agent, or Firm* — Rankin, Hill & Clark LLP

(57) ABSTRACT

The attention calling system includes a detection unit for detecting an object around a moving body, and a attention calling unit for outputting a visual display in a horizontally extending belt-like range on an interior structure of the moving body using a light projection device. The attention calling unit outputs the visual display in the belt-like range at a position corresponding to a direction of the object.

13 Claims, 18 Drawing Sheets

(56) References Cited

U.S. PATENT DOCUMENTS

| | | | |
|---|---|---|---|
| 2016/0110618 A1* | 4/2016 | Oba | G06V 20/58 |
| | | | 348/148 |
| 2016/0121794 A1* | 5/2016 | Iguchi | G08G 1/166 |
| | | | 345/7 |
| 2016/0152184 A1* | 6/2016 | Ogawa | G09G 5/373 |
| | | | 345/589 |
| 2016/0205246 A1* | 7/2016 | Sim | H04M 1/72454 |
| | | | 455/419 |
| 2017/0003848 A1* | 1/2017 | Wakayanagi | G01C 21/367 |
| 2017/0187963 A1* | 6/2017 | Lee | H04N 23/61 |
| 2017/0336627 A1* | 11/2017 | Ieda | G01C 21/36 |
| 2018/0017799 A1* | 1/2018 | Ahmad | H04N 23/635 |
| 2018/0024354 A1* | 1/2018 | Shibata | B60W 30/12 |
| | | | 345/7 |
| 2018/0198955 A1* | 7/2018 | Watanabe | G08G 1/16 |
| 2018/0240258 A1* | 8/2018 | Kosaka | B60W 50/14 |
| 2018/0330509 A1* | 11/2018 | Watanabe | G05D 1/0214 |
| 2018/0352204 A1* | 12/2018 | Fujita | H04N 9/3188 |
| 2019/0071014 A1* | 3/2019 | Misu | G08G 1/166 |
| 2019/0381937 A1* | 12/2019 | Rakshit | B60R 1/001 |
| 2020/0207272 A1* | 7/2020 | Matsuo | G06T 11/00 |
| 2021/0129860 A1* | 5/2021 | Lee | B60K 35/00 |
| 2021/0323470 A1* | 10/2021 | Mizuno | G08G 1/166 |
| 2021/0323540 A1* | 10/2021 | De Weser | B60R 1/00 |
| 2021/0383097 A1* | 12/2021 | Guerard | G06V 20/64 |
| 2022/0032945 A1* | 2/2022 | Schumacher | G08G 1/167 |
| 2022/0080888 A1* | 3/2022 | Hayashi | G02B 27/0093 |
| 2022/0108640 A1* | 4/2022 | Kunze | G08G 1/0962 |
| 2022/0161814 A1* | 5/2022 | Hayami | G01S 13/862 |
| 2022/0319329 A1* | 10/2022 | Kim | H04W 4/90 |

* cited by examiner

FIG. 6

| CATEGORY | COGNITION PROFICIENCY VALUE | | | | |
|---|---|---|---|---|---|
| | FIRST | SECOND | THIRD | FOURTH | FIFTH |
| VEHICLE APPEARING FROM CROSSING ROAD IN PRESENCE OF SHIELDING OBJECT | 5 | 4 | 4 | 4 | 3 |
| VEHICLE APPEARING FROM CROSSING ROAD IN ABSENCE OF SHIELDING OBJECT | 4 | 3 | 4 | 3 | 3 |
| PEDESTRIAN CROSSING TRAVELING ROAD AT INTERSECTION | 2 | 2 | 1 | 3 | 1 |
| VEHICLE RUNNING STRAIGHT ON OPPOSITE LANE OF TRAVELING ROAD AT INTERSECTION | 2 | 2 | 1 | 1 | 1 |

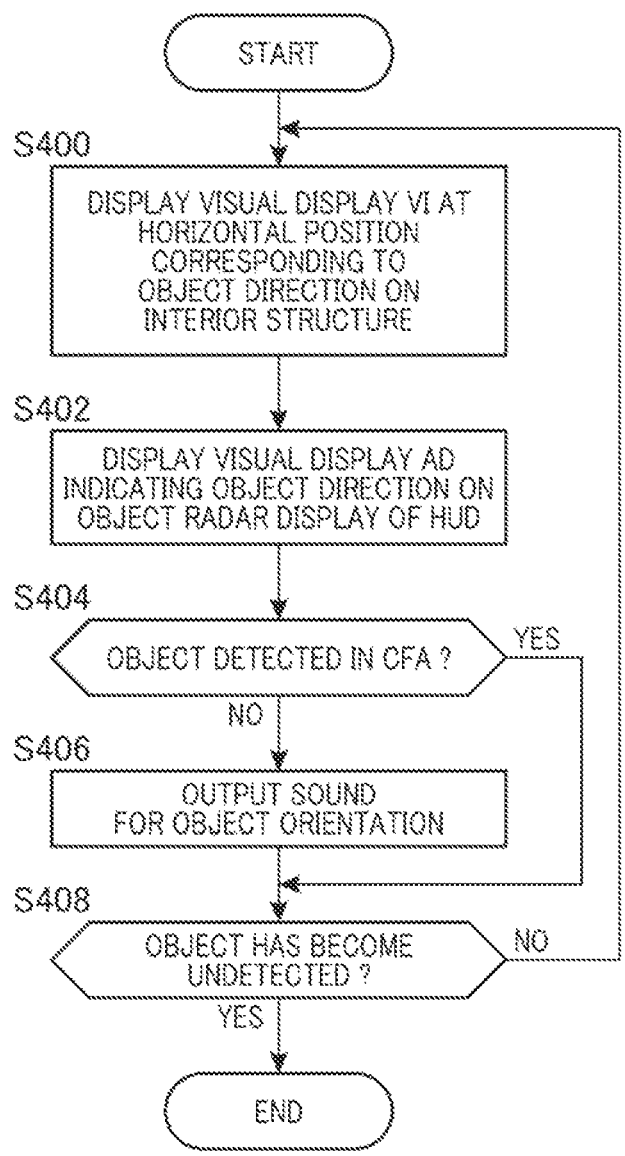

ATTENTION CALLING SYSTEM AND ATTENTION CALLING METHOD

INCORPORATION BY REFERENCE

The present application claims priority under 35 U.S.C. § 119 to Japanese Patent Application No. 2021-040550 filed on Mar. 12, 2021. The content of the application is incorporated herein by reference in its entirety.

BACKGROUND OF THE INVENTION

Field of the Invention

The present invention relates to an attention calling system and an attention calling method for calling an attention of an operator of a moving body to a real object existing around the moving body.

Description of the Related Art

It is advantageous to call a vehicle operator's attention to traffic participants which are likely to be overlooked in the environment surrounding the vehicle (hereinafter referred to as an own vehicle).

Japanese Unexamined Patent Application Publication No. 2017-021546 discloses the vehicle image display system configured to display a contour image of a preceding vehicle on the windshield of an own vehicle so that the contour image is overlaid with the real preceding vehicle seen from the operator's position.

Assuming that the disclosed technique of the display system is utilized for calling the operator's attention to many traffic participants in the traffic environment such as the urbane area, many contour images will be displayed while being overlaid with the individual traffic participants on the windshield, resulting in attention distraction of the operator.

An object of the present invention, which has been made in light of the foregoing circumstances, is to call the operator's attention to various real objects existing in the environment surrounding the moving body without distracting the operator's attention.

SUMMARY OF THE INVENTION

An attention calling system according to an aspect of the present invention includes a light projection device which outputs a visual display visually recognizable by an operator of the moving body on an interior structure of a moving body, and an attention calling device which controls the light projection device to call the operator's attention to an object around the moving body by means of the visual display. The attention calling device includes a detection unit for detecting the object existing in an area surrounding the moving body, and an attention calling unit for outputting the visual display in a predetermined display range on the interior structure of the moving body by controlling the light projection device. The display range on the interior structure is a horizontally extending belt-like range orthogonal to a height direction of the moving body. The attention calling unit outputs the visual display to a horizontal position corresponding to a direction of the object seen from a position of the operator in the display range on the interior structure.

In the aspect of the present invention, the attention calling unit generates a sound to be output to the operator for orientation of the object through a speaker disposed inside the moving body in addition to the visual display.

In the aspect of the present invention, the light projection device outputs the visual display by projecting predetermined-shaped light onto the interior structure.

In the aspect of the present invention, the interior structure is in the form of a windshield, a front ventilation window, a door glass, and/or a rear glass of the moving body.

In the aspect of the present invention, at least one of the light projection devices outputs the visual display by projecting predetermined-shaped light onto a windshield of the moving body.

In the aspect of the present invention, the light projection device for outputting the visual display onto the windshield includes multiple light sources arranged below the windshield along a horizontal direction.

In the aspect of the present invention, the attention calling unit displays a ring-shaped display indicating a direction from the moving body on a display unit, and outputs the visual display to an arc part corresponding to a direction of the object.

In the aspect of the present invention, the object is a real object having a probability of contact with the moving body equal to or higher than a given value.

In the aspect of the present invention, the attention calling unit displays the visual display in a mode adapted to the probability of contact.

An attention calling method according to another aspect of the present invention is implemented by a computer. The method includes the steps of detecting an object existing in an area surrounding a moving body, and outputting a visual display in a predetermined display range on an interior structure of the moving body by controlling a light projection device disposed in the moving body. The display range on the interior structure is a horizontally extending belt-like range orthogonal to a height direction of the moving body. In the step of outputting the visual display, the visual display is output to a horizontal position corresponding to a direction of the object seen from a position of the operator of the moving body in the display range on the interior structure.

The present invention is capable of calling the operator's attention to various real objects existing in the environment surrounding the moving body without distracting the operator's attention.

BRIEF DESCRIPTION OF THE DRAWINGS

FIG. 6 shows an example of cognition proficiency information which is stored in a storage unit by a cognition skill evaluation unit of the attention calling system as illustrated in FIG. 5;

FIG. 18 is a flowchart representing an operation procedure executed by the attention calling system as illustrated in FIG. 13.

DETAILED DESCRIPTION OF THE PREFERRED EMBODIMENTS

Figure 1:
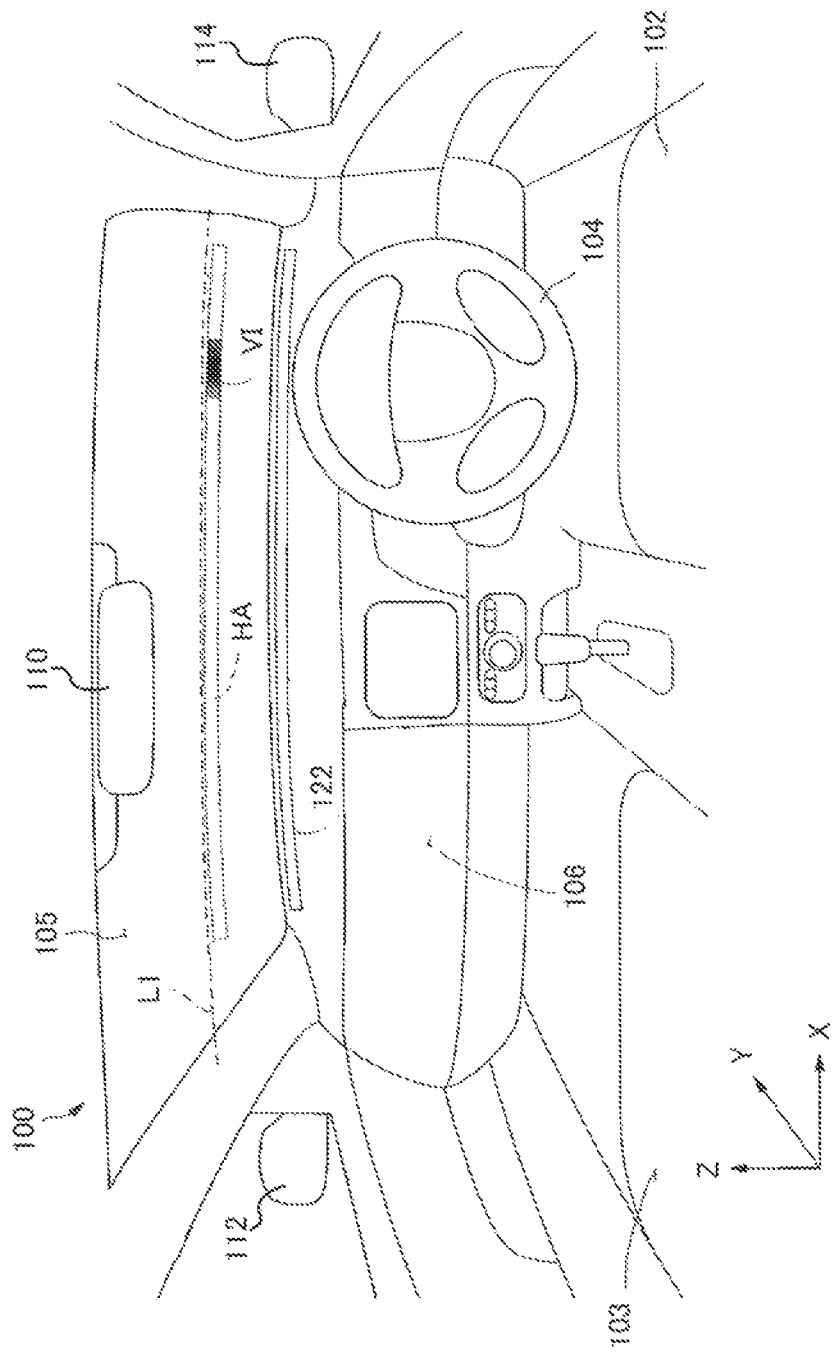
FIG. 1 is a view of a front interior structure of a vehicle which is installed with the attention calling system according to an embodiment of the present invention.

Embodiments will be described referring to the drawings.

First Embodiment

Figure 2:
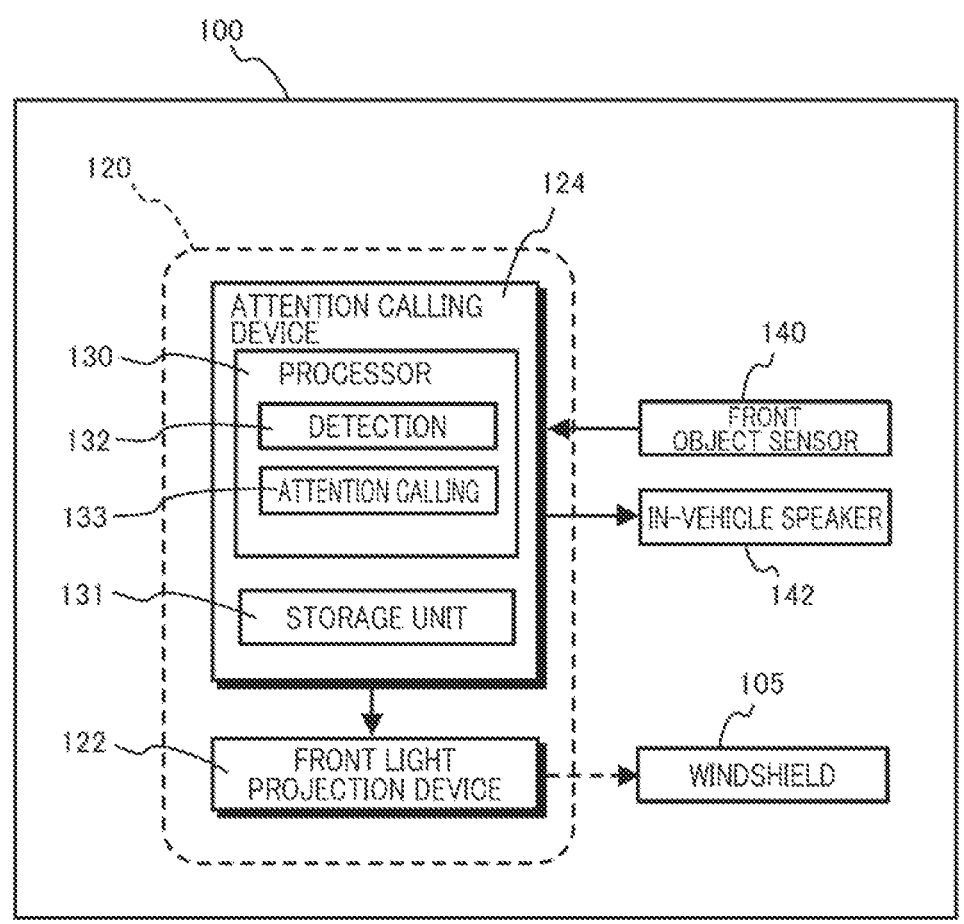
FIG. 2 illustrates a structure of an attention calling system according to a first embodiment of the present invention.

A first embodiment of the present invention will be described. FIG. 1 is a view of a front interior structure of a vehicle 100 as a moving body which is installed with an attention calling system according to an embodiment of the present invention. FIG. 2 illustrates a structure of an attention calling system 120 according to the first embodiment. Structures of other parts of the vehicle 100 will be described later in association with other embodiments.

In the embodiment, the vehicle 100 is a four-wheeled vehicle. Referring to FIG. 1, a Z-axis denotes a vehicle height direction of the vehicle 100, an X-axis denotes a vehicle width direction of the vehicle 100, and a Y-axis denotes a longitudinal direction of the vehicle 100 (or a straight-running direction). In the following description, a direction (including X-axis and Y-axis directions) orthogonal to the vehicle height direction (Z-axis direction) will be referred to as a horizontal direction.

Referring to FIG. 1, an operator's seat 102 as a driver's seat and a front passenger seat 103 are disposed in the interior of the vehicle 100. In the interior of the vehicle 100, a steering wheel 104, a windshield 105 serving as a partition between the vehicle exterior and the vehicle interior, and an instrument panel 106 are provided. The vehicle 100 includes a rearview mirror 110, a left fender mirror (or left door mirror) 112, and a right fender mirror (or right door mirror) 114 for helping the operator to visually recognize the rear view and the rear side view of the vehicle 100.

Referring to FIG. 2, the attention calling system 120 includes a front light projection device 122 and an attention calling device 124, which are disposed in the interior of the vehicle 100. The front light projection device 122 outputs a visual display on the windshield 105, which can be visually recognized by the operator. The attention calling device 124 controls the front light projection device 122 to call the operator's attention to the object by means of the visual display. The front light projection device 122 projects predetermined-shaped light (graphical shape such as a rectangle) onto the windshield 105 for outputting the visual display.

Referring to FIG. 1, in the embodiment, the front light projection device 122 is formed as a light source array consisting of multiple light sources arranged on the instrument panel 106 below the windshield 105 along the vehicle width direction, for example, an LED array capable of projecting multi-colored light. The front light projection device 122 projects light to the windshield 105 under the control of the attention calling device 124 so that a visual display VI for guiding the operator's visual line is displayed below an upper limit displayable line L1 of the windshield 105. The upper limit displayable line L1 indicates the upper limit position that allows display of an image in the upper-lower direction (vehicle height direction) of the windshield 105. The upper limit position indicated by the upper limit displayable line L1 is prescribed by the legal regulation. For example, the upper limit position may be limited by the domestic law, domestic regulation, or the like.

The visual display VI is formed by projecting predetermined-sized light to the windshield 105. The visual display VI is a virtual image formed in a visual field of the operator resulting from reflection of the projected light. The position and size (horizontal length) of the visual display VI on the windshield 105 may be determined by selecting the light source used for projecting light to the windshield 105 from the multiple light sources that constitute the front light projection device 122.

A display range HA of the visual display VI extends below a displayable upper limit line L1 of the windshield 105. The display range HA as a belt-like range with a predetermined width (for example, ***) extends on the windshield 105 in the vehicle width direction of the vehicle 100. The display range HA may be referred to as a belt-like range on the windshield 105, which horizontally extends in the direction orthogonal to the vehicle height direction of the vehicle 100.

The light source array or the LED array is an example of the front light projection device 122. However, the structure of the front light projection device 122 is not limited to the one as described above. Any configuration may be conceivable for the front light projection device 122 so long as the visual display VI with predetermined or larger size can be projected in the display range HA. For example, the front light projection device 122 may be a so-called projector for displaying an image as the visual display VI with predetermined size or larger in the display range HA.

Referring to FIG. 2, the attention calling device 124 includes a processor 130 and a storage unit 131. The storage unit 131 is constituted by a volatile or non-volatile semiconductor memory, and/or a hard disk device. The processor 130 is a computer having such processor as CPU (Central Processing Unit). The processor 130 may be provided with ROM (Read Only Memory) to which programs have been written, RAM (Random Access Memory) for temporal data storage, and the like. The processor 130 includes a detection unit 132 and an attention calling unit 133 each as a functional element or a functional unit.

Those functional elements of the processor 130 are implemented through execution of the program by the processor 130 as the computer. The computer program can be stored in an arbitrary computer-readable storage medium. Alternatively, it is possible to form all or part of the functional elements of the processor 130 into hardware devices each including one or more electronic circuit components.

The detection unit 132 detects the object existing in the area surrounding the vehicle 100. The object may, for example, be a real object having its probability of contact with the vehicle 100 equal to or higher than a given value. The contact probability is calculated from the relative speed of the object to the vehicle 100.

Specifically, the detection unit 132 acquires a video image (or image) from a front object sensor 140 installed in the vehicle 100 for detecting an object to the front of the vehicle 100. The front object sensor 140 may be a camera, a laser, and/or a lidar. The detection unit 132 detects a predetermined real object from the front video image derived from the front object sensor 140. If the detected real object has the contact probability with the vehicle 100 derived from the relative speed to the vehicle 100 is equal to or larger than the given value, the real object is detected as the object. In the embodiment, the predetermined real object may be traffic participants including vehicles and pedestrians, and fixtures including road signs, electric poles, mailboxes, and the like. The detection unit 132 sends position information of each of the detected objects to the attention calling unit 133.

The attention calling unit 133 controls the front light projection device 122 to output the visual display to the display range HA on the windshield 105 of the vehicle 100. Specifically, the attention calling unit 133 displays the visual display VI at the horizontal position in the display range HA, which is the same as that of the object on the windshield 105 seen from the operator's position.

More specifically, the attention calling unit 133 calculates each intersection point between the operator's visual line directed to the objects and the windshield 105 based on the standard eye position of the operator seated on the operator's seat 102, and each piece of position information of the objects received from the detection unit 132. The attention calling unit 133 displays each visual display VI at the horizontal position in the display range HA, which is the same as that of the calculated intersection point.

If the object is detected at a position deviating from a predetermined front visual field range around the operator seated on the operator's seat of the vehicle 100 as the center, the attention calling unit 133 generates a sound through distributedly disposed multiple in-vehicle speakers 142 for notifying the operator of object orientation.

The front visual field range is determined to allow the operator seated on the operator's seat to perform visual recognition naturally while keeping the operator's face directed forward. The front visual field range is defined by the predetermined viewing angle (for example, 45°) from the visual line of the operator seated on the operator's seat in the straight-running direction (Y-direction of FIG. 1) of the vehicle 100.

Unlike the generally employed technique, the above-configured attention calling system 120 does not display the image overlaid with the real object on the windshield, but displays the visual display VI on the windshield 105 at the same horizontal position as that of the object seen from the operator's position in the belt-like display range HA extending in the vehicle width direction. In this case, since reduced chance for the operator to see the object overlaid with the visual display VI enhances concentration of the operator, the attention calling system 120 is capable of calling the operator's attention to various traffic participants in the environment surrounding the vehicle 100.

The front light projection device 122 outputs the visual display VI on the windshield 105 by projecting predetermined-shaped light (graphical shape such as a rectangle). The simple visual display VI is capable of calling the operator's attention to the object without distracting attention.

The front light projection device 122 includes multiple light sources arranged along the vehicle width direction below the windshield 105. The simply configured attention calling system 120 is capable of calling the operator's attention to the object.

If the object is detected in the area surrounding the vehicle 100 at a position deviating from the predetermined front visual field range around the operator seated on the operator's seat of the vehicle 100 as the center, the attention calling unit 133 generates a sound inside the vehicle for the object orientation. The attention calling system 120 generates the sound to allow the operator to perform orientation of the detected object in the area demanding the operator to move his/her face to visually recognize the object. This makes it possible to call the operator's attention to the object without distracting the attention.

In the attention calling system 120, the object denotes the real object with probability of contact with the vehicle 100 equal to or larger than the given value. That is, the attention calling system 120 narrows down the real object that is likely to cause the risk to the operation of the vehicle 100, and displays the visual display VI indicating the direction of the object. This makes it possible to call the operator's attention to the object further concentratedly.

Figure 3:
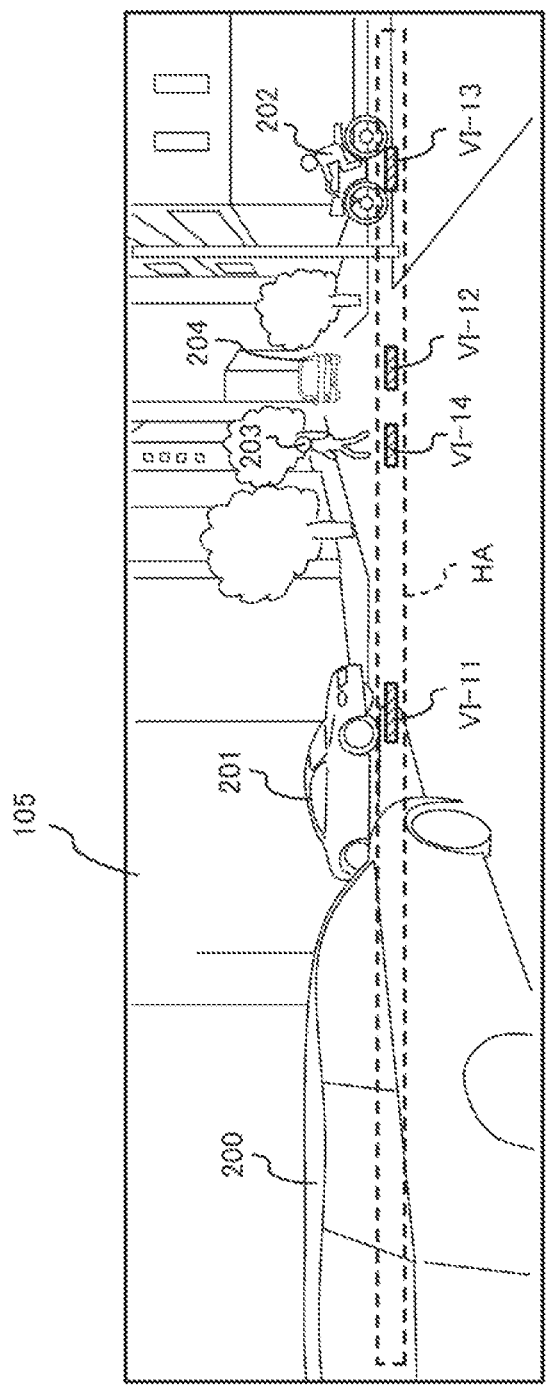
FIG. 3 illustrates an example of visual displays on the windshield, which are displayed by the attention calling system as illustrated in FIG. 2.

FIG. 3 illustrates an example of the visual displays VI on the windshield 105, which are displayed by the attention calling system 120. FIG. 3 illustrates a scene of the front area of the vehicle 100 seen by the operator in the vehicle 100 through the windshield 105. The illustrated example shows a vehicle 200 parked at the left side before the intersection, a vehicle 201 running from the left side of the crossing road, and a motorbike 202 running from the right side of the crossing road in the front area of the urban area having the intersection. In the front area, a pedestrian 203 is crossing the traveling road on which the own vehicle 100 is running, and a vehicle 204 is running on the opposite lane of the traveling road.

At this moment, the detection unit 132 detects vehicles except the parked vehicle 200, that is, the vehicles 201, 204, the motorbike 202, and the pedestrian 203 crossing the road as the objects liable to contact with the vehicle 100. The attention calling unit 133 allows the front light projection device 122 to display visual displays VI-11, VI-12, VI-13, VI-14 (hatched rectangles) at the horizontal positions corresponding to the vehicles 201, 204, the motorbike 202, and the pedestrian 203 as the detected objects in the display range HA (rectangular range indicated by a dotted line) on the windshield 105.

Figure 4:
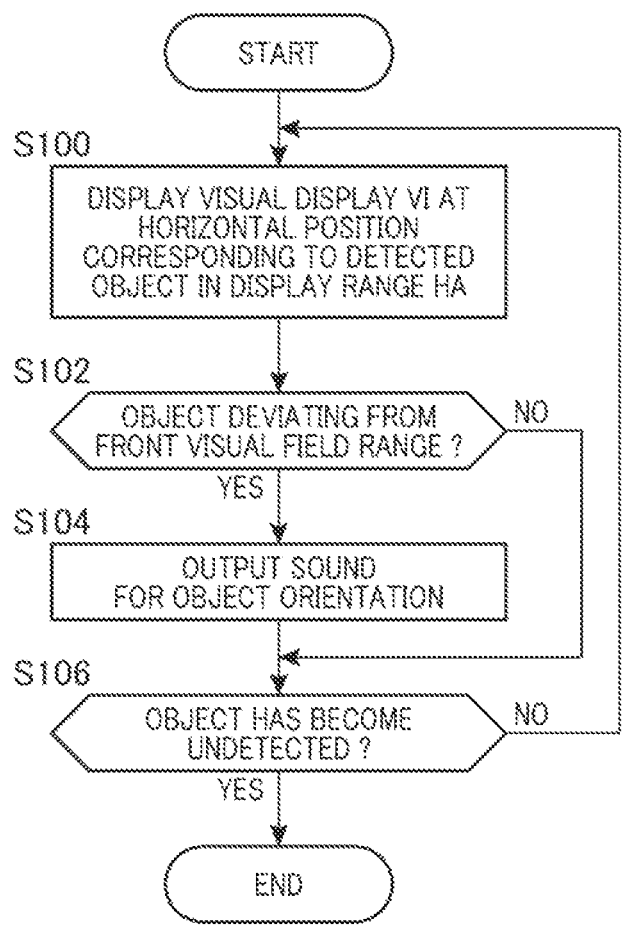
FIG. 4 is a flowchart representing an operation procedure executed by the attention calling system as illustrated in FIG. 2.

FIG. 4 is a flowchart representing an operation procedure executed by the attention calling system 120. When the detection unit 132 as illustrated in FIG. 2 detects at least one object, the process shown in FIG. 4 is started for each of the detected objects.

Upon start of the process, the attention calling unit 133 allows the front light projection device 122 to display the visual displays VI at the horizontal positions corresponding to the respective detected objects in the display range HA on the windshield 105 based on the respective position information of the objects detected by the detection unit 132 (S100).

The attention calling unit 133 determines whether or not the object has been detected at the position deviating from the predetermined front visual field range based on the position information of the object received from the detection unit 132 (S102). If the object has been detected at the position deviating from the predetermined front visual field range (YES in S102), the attention calling unit 133 outputs a sound through the in-vehicle speaker 142 for notifying the operator of orientation of the object (S104).

The attention calling unit 133 determines whether or not the object has become undetected to the detection unit 132 (S106). If the object has become undetected (YES in S106), the attention calling unit 133 terminates execution of the process. Meanwhile, if the object is continuously detected (NO in S106), the attention calling unit 133 returns to step S100 for executing the process repeatedly.

Second Embodiment

Figure 5:
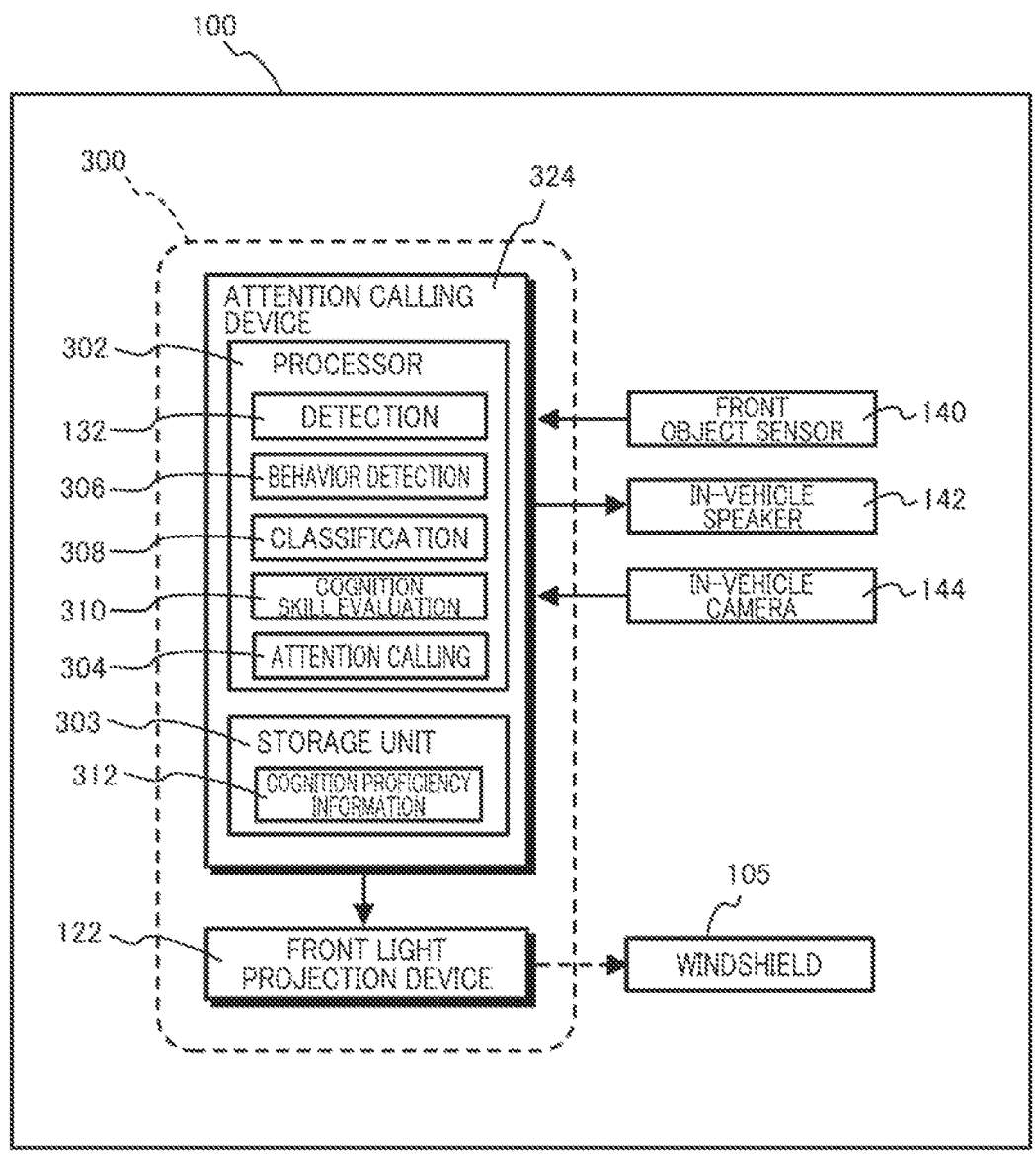
FIG. 5 illustrates a structure of an attention calling system according to a second embodiment of the present invention.

A second embodiment according to the present invention will be described. FIG. 5 illustrates a structure of an attention calling system 300 according to the second embodiment of the present invention. In place of the attention calling system 120, the attention calling system 300 is installed in the vehicle 100 as described in the first embodiment referring to FIG. 1. The components shown in FIG. 5, which are the same as those shown in FIG. 2 will be designated with the same codes, and explanations referring to FIG. 2 will apply correspondingly.

The attention calling system 300 includes the front light projection device 122 for outputting the visual display onto the windshield 105, which can be visually recognized by the operator, and an attention calling device 324 for controlling the front light projection device 122 to call the operator's attention to the object by means of the visual display.

The attention calling device 324 has its structure similar to that of the attention calling device 124 as illustrated in FIG. 2 except that a processor 302 and a storage unit 303 are provided in place of the processor 130 and the storage unit 131. The storage unit 303 is constituted by the volatile or nonvolatile semiconductor memory, and/or a hard disk device. A cognition skill evaluation unit 310 of the processor 302 to be described later stores cognition proficiency information 312.

The processor 302 has its structure similar to that of the processor 130 except that an attention calling unit 304 is provided as the functional element or the functional unit in place of the attention calling unit 133. Unlike the processor 130, the processor 302 further includes a behavior detection unit 306, a classification unit 308, and the cognition skill evaluation unit 310 as the functional elements or the functional units.

Like the processor 130, those functional elements of the processor 302 are implemented through execution of the program by the processor 302 as the computer. The computer program can be stored in an arbitrary computer-readable storage medium. Alternatively, it is possible to form all or part of the functional elements of the processor 302 into hardware devices each including one or more electronic circuit components.

The behavior detection unit 306 detects movements of visual line and face direction (hereinafter referred to as the face movement) of the operator using an in-vehicle camera 144 installed in the vehicle 100. The in-vehicle camera 144 is a so-called driver monitoring camera (DMC) for observing the operator.

The classification unit 308 classifies each of the detected objects into one of multiple categories based on at least a type of the object, and the traffic scene in the presence of the object. The category of the object may be a segment indicating an object appearing place, an object appearing timing, and/or a motion of the appearing object in the current traffic scene in addition to the object type.

The object type indicates the segment that divides the objects into the pedestrian, vehicle, obstacle, and the like. The pedestrian may be subdivided into an adult, a child, an aged person, and the like. The vehicle may be subdivided into an automobile, a motorbike, a bus, a bicycle, and the like. The obstacle may be subdivided into a ball, a fallen object, a disabled car, and the like.

The traffic scene is divided into a straight road, a railroad crossing, an intersection, a corner, and the like. The intersection may further be subdivided into the intersection in the presence of the parked vehicle, the intersection in the absence of the parked vehicle, the intersection with low visibility in the presence of building, the intersection with high visibility, and the like. The traffic scene may be subdivided in accordance with the number of traffic participants existing in the scene and/or the average speed of the traffic participants.

The thus obtained category may be expressed as "child appearing from the parked vehicle at the intersection", "bicycle appearing from building at the intersection with low visibility", "motorbike running straight forward on the opposite lane at the intersection", and the like.

The cognition skill evaluation unit 310 calculates a cognition proficiency value indicating a degree of cognition proficiency with respect to each categorized object, and stores the calculated cognition proficiency value for each category in the storage unit 303 as the cognition proficiency information 312. The degree of cognition proficiency with respect to the object represents the degree of intentionality to take action to reach the object cognition state (movement of visual line or face). The intentionality to take action to reach the cognition state may be dependent on the object appearing place, the object appearing timing, and/or appearing motions in the current traffic scene in addition to the category or type of the object. The cognition skill evaluation unit 310 associates the calculated object cognition proficiency value with the category of the object, and stores the cognition proficiency information 312 indicating the cognition proficiency value for each category in the storage unit 303.

Specifically, when the operator visually recognizes the object, the cognition skill evaluation unit 310 calculates the operator's cognition proficiency value with respect to the category of the object based on whether or not the operator's face has moved toward the object before moving the visual line to the object. This is because, upon intentional visual recognition of presence/absence of the traffic participant based on prediction to some extent, the operator generally tends to timely face toward the place where the traffic participants are likely to appear, in other words, toward the real object before moving his/her visual line toward the real object.

The cognition skill evaluation unit 310 calculates the cognition proficiency value of the category of the object as a target for calculating the proficiency value based on whether or not the object as the target for calculating the proficiency value is the real object that has undergone the visual line passage during the visual line movement to the other object, and whether or not the face movement is followed by the visual line movement.

The determination with respect to the operator's visual recognition of the object can be made by the behavior detection unit 306 based on whether or not the operator's visual line has been retained on the object for a given or longer time.

More specifically, the cognition skill evaluation unit 310 calculates the cognition proficiency value with respect to the category of the object in the following manner.

a) After the visual line movement subsequent to the face direction movement, if the visual line has been retained on the object for the given or longer time, the cognition proficiency value of the category of the object is set to 1.

b) During the visual line movement subsequent to the face direction movement, if the visual line has passed an object, the cognition proficiency value of the category of the object is set to 2.

c) After the visual line movement with no preceding face direction movement, if the visual line has been retained on an object for the given or longer time, the cognition proficiency value of the category of the object is set to 3.

d) During the visual line movement with no preceding face direction movement, if the visual line has passed an object, the cognition proficiency value of the category of the object is set to 4.

e) If the visual line has never been retained on nor passed an object, the cognition proficiency value of the category of the object is set to 5.

Like the attention calling unit 133, the attention calling unit 304 controls the front light projection device 122 to output the visual display VI in the display range HA on the windshield 105 of the vehicle 100 as illustrated in FIG. 1. Unlike the attention calling unit 133, the attention calling unit 304 refers to the cognition proficiency information 312 stored in the storage unit 303 upon output of the visual display VI, and displays the visual display VI indicating each direction position of the detected objects in the display range HA on the windshield 105 in the mode adapted to the operator's cognition proficiency value which has been calculated for each category of the object based on the cognition proficiency information 312.

Specifically, the visual display VI may be displayed in the mode adapted to the operator's cognition proficiency value by means of, for example, color, luminance, and/or size of the visual display VI as the projected light in accordance with the operator's cognition proficiency value.

FIG. 6 represents an example of the cognition proficiency information 312 stored in the storage unit 303 by the cognition skill evaluation unit 310. In FIG. 6, the cognition proficiency information of an operator is listed in the form of a table. The cognition skill evaluation unit 310 stores the cognition proficiency information as shown in FIG. 6 in the storage unit 303. Referring to the table of FIG. 6, rows from the left to the right will be referred to as a first row, a second row, . . . , and a sixth row, and columns downward from the top will be referred to as a first column, a second column, a third column, . . . , and a sixth column.

The first row of the cognition proficiency information table as shown in FIG. 6 represents a list of categories used by the classification unit 308 for object classification. The categories in the first row of FIG. 6 are expressed descriptively. However, like the generally employed technique, the segments such as presence/absence of shielding object, crossing road/traveling road, pedestrian/vehicle, and the like may be formed into combinations of codes, each of which is usable as the category.

Values from the second to the sixth rows correspond to the most recent cognition proficiency values of each categorized objects calculated five times by the cognition skill evaluation unit 310. Values in the third column from the second to the sixth rows indicate the most recent cognition proficiency values calculated five times at each time when the operator encounters the vehicle categorized as the "vehicle appearing from crossing road in the absence of shielding object."

Figure 7:
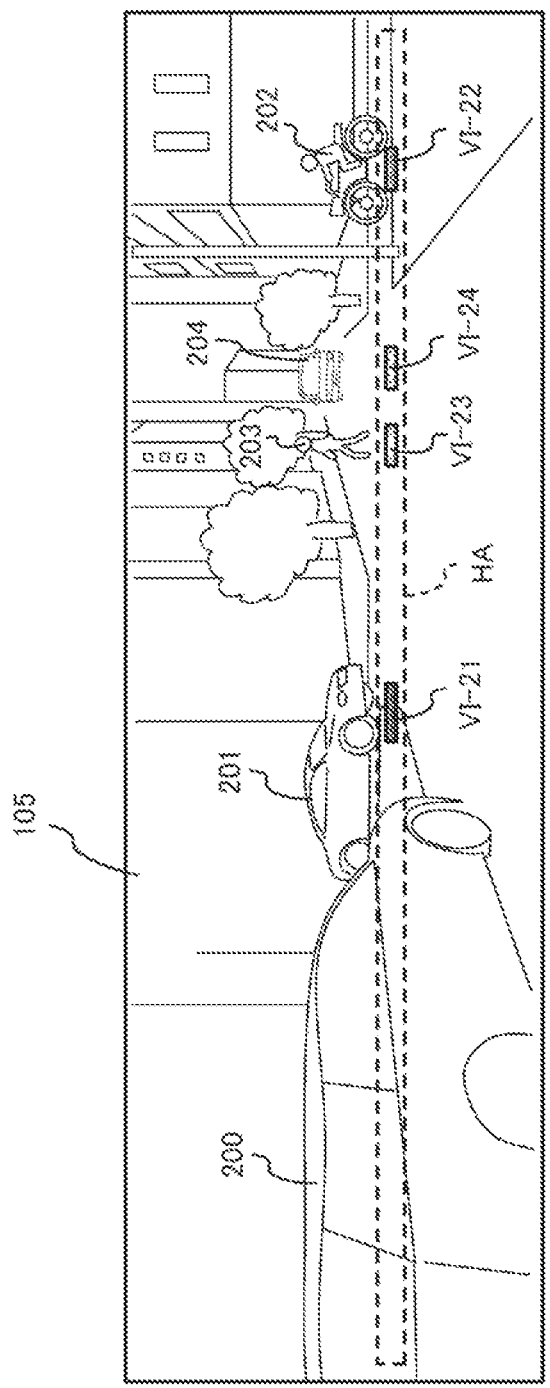
FIG. 7 illustrates an example of visual displays on the windshield, which are displayed by the attention calling system as illustrated in FIG. 5.

FIG. 7 illustrates an example of visual displays VI on the windshield 105, which are displayed by the attention calling unit 304 based on the cognition proficiency information as shown in FIG. 6. The traffic scene of the area to the front of the vehicle 100 as illustrated in FIG. 7 is the same as the one illustrated in FIG. 3. In this case, it is assumed that the classification unit 308 classifies the vehicle 201 as the category of "vehicle appearing from crossing road in the presence of shielding object", and the vehicle 204 as the category of "vehicle running straight on the lane opposite to the traveling road at the intersection". It is assumed that the classification unit 308 classifies the motorbike 202 and the pedestrian 203 as the categories of "vehicle appearing from crossing road in the absence of shielding object", and "pedestrian crossing the traveling road at the intersection", respectively.

The attention calling unit 304 refers to the cognition proficiency information 312 stored in the storage unit 303 as shown in FIG. 6 for displaying the visual displays VI of the vehicles 201, 204, the motorbike 202, and the pedestrian 203 as the objects detected by the detection unit 132 in the display range HA on the windshield 105.

The attention calling unit 304 displays the visual display VI of the categorized object in the mode having its visual attractivity higher as increase in the cognition proficiency value from 1 to 5 in accordance with the cognition proficiency value of the category indicated by the cognition proficiency information 312. The expression of "display in the mode having its visual attractivity higher" represents that the hue of the visual display VI is sequentially changed from cool to warm color so as to be more conspicuous as increase in the cognition proficiency value from 1 to 5. It is possible to use not only the hue but also brightness (color tone), flickering speed, size, or the like for the mode to change the visual display VI adapted to the cognition proficiency value. In this embodiment, it is assumed that as the cognition proficiency value is increased step by step from 1 to 5, the visual display VI will be displayed in blue, green, yellow, orange, and red, respectively.

The example of FIG. 6 shows that the cognition proficiency value 4 is the most frequent result of the recent cognition proficiency values calculated five times with respect to the category encountered by the operator, that is, the "vehicle appearing from crossing road in the presence of shielding object". Accordingly, the attention calling unit 304 displays the visual display VI-21 of the above-categorized vehicle 201 in orange in the display range HA on the windshield 105 as illustrated in FIG. 7. The value 3 is shown as the most frequent result of the recent cognition proficiency values calculated five times with respect to the category of the "vehicle appearing from crossing road in the absence of shielding object". Accordingly, the attention calling unit 304 displays the visual display VI-22 of the above-categorized motorbike 202 in yellow in the display range HA on the windshield 105 as illustrated in FIG. 7.

Similarly, the value 2 is shown as the most frequent result of the recent cognition proficiency values calculated five times with respect to the category of the "pedestrian crossing the traveling road at the intersection". Accordingly, the attention calling unit 304 displays the visual display VI-23 of the above-categorized pedestrian 203 in green in the display range HA on the windshield 105 as illustrated in FIG. 7. The value 1 is shown as the most frequent result of the recent cognition proficiency values calculated five times with respect to the category of the "vehicle running straight on the lane opposite to the traveling road at the intersection". Accordingly, the attention calling unit 304 displays the visual display VI-24 of the above-categorized vehicle 204 in blue in the display range HA on the windshield 105 as illustrated in FIG. 7.

The color as the mode for displaying the visual display VI is selected using the most frequent value as the recent result of cognition proficiency values calculated five times with respect to each category. It is also possible to use an integer value derived from revaluation/devaluation, and rounding of the average value of the recent results of cognition proficiency values calculated five times, and the minimum/maximum value of the recent results of cognition proficiency values calculated five times.

Like the attention calling system 120, the above-configured attention calling system 300 displays the visual display VI at a horizontal position corresponding to the object in the belt-like display range HA on the windshield 105. Like the attention calling system 120, the attention calling system 300 is capable of calling the operator's attention to various traffic participants existing in the environment surrounding the vehicle 100 without distracting the operator's attention.

Especially, the attention calling system 300 is configured to display the visual display VI of the object in the mode adapted to the cognition proficiency value of the operator with respect to the category of the object. The attention calling system 300 allows the operator to visually recognize the respective objects with priority in accordance with the cognition proficiency value by means of the output visual display VI. This makes it possible to call the operator's attention to various traffic participants existing in the environment surrounding the vehicle 100 in more effective mode for driving operations performed by the operator.

The attention calling system 300 is configured to calculate the cognition proficiency value for each category of the objects based on presence/absence of the face movement prior to the visual line movement, which indicates the operator's intentional movement for cognition. This makes it possible to calculate the cognition proficiency value by executing the simple process.

The attention calling system 300 is configured to determine the cognition proficiency value with respect to the category of the specific object (undergoes the visual line passage) depending on whether or not the object has undergone the visual line passage during the intentional visual line movement for visually recognizing the object. The attention calling system 300 obtains the cognition proficiency value of the object that is not a target of visual recognition based on the tendency for the movement path of the operator's visual line. The cognition proficiency value can be reflected to the mode for displaying the visual display.

Figure 8:
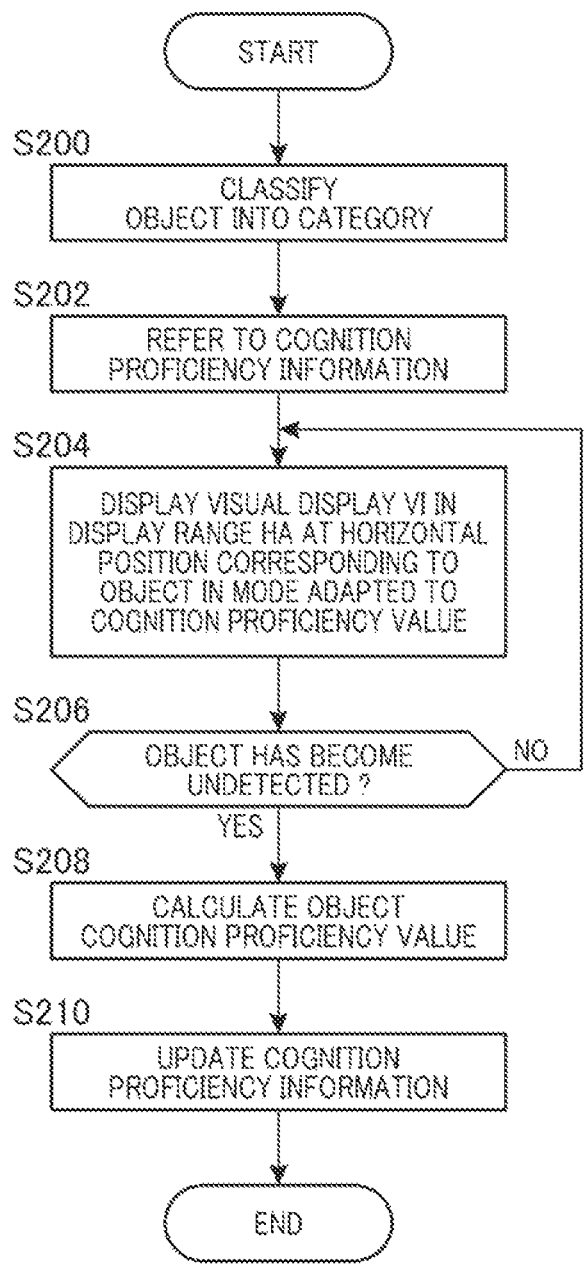
FIG. 8 is a flowchart representing an operation procedure executed by the attention calling system as illustrated in FIG. 5.

FIG. 8 is a flowchart representing an operation procedure executed by the attention calling system 300. When the detection unit 132 as illustrated in FIG. 5 detects at least one object, the process shown in FIG. 8 is started for each of the detected objects.

Upon start of the process, the classification unit 308 classifies the detected object into the category (S200). The attention calling unit 304 refers to the cognition proficiency information 312 stored in the storage unit 303 (S202), and displays the visual display VI at the horizontal position corresponding to the object in the display range HA in the mode adapted to the cognition proficiency value (S204).

The attention calling unit 304 determines whether or not the object has become undetected to the detection unit 132 (S206). If the object is continuously detected (NO in S206), the attention calling unit 304 returns to step S204 for executing the process repeatedly. Meanwhile, if the object has become undetected (YES in S206), the cognition skill evaluation unit 310 calculates the operator's cognition proficiency value with respect to the object based on how visual line and face direction of the operator move, which have been detected by the behavior detection unit 306 (S208).

The cognition skill evaluation unit 310 stores the calculated cognition proficiency value in association with the category of the object in the storage unit 303 as the cognition proficiency information. Specifically, the cognition skill evaluation unit 310 adds the calculated cognition proficiency value to the cognition proficiency information 312 stored in the storage unit 303 for updating the cognition proficiency information 312 (S210). After the cognition proficiency information 312 is updated by the cognition skill evaluation unit 310, the processor 302 terminates the process.

Third Embodiment

Figure 9:
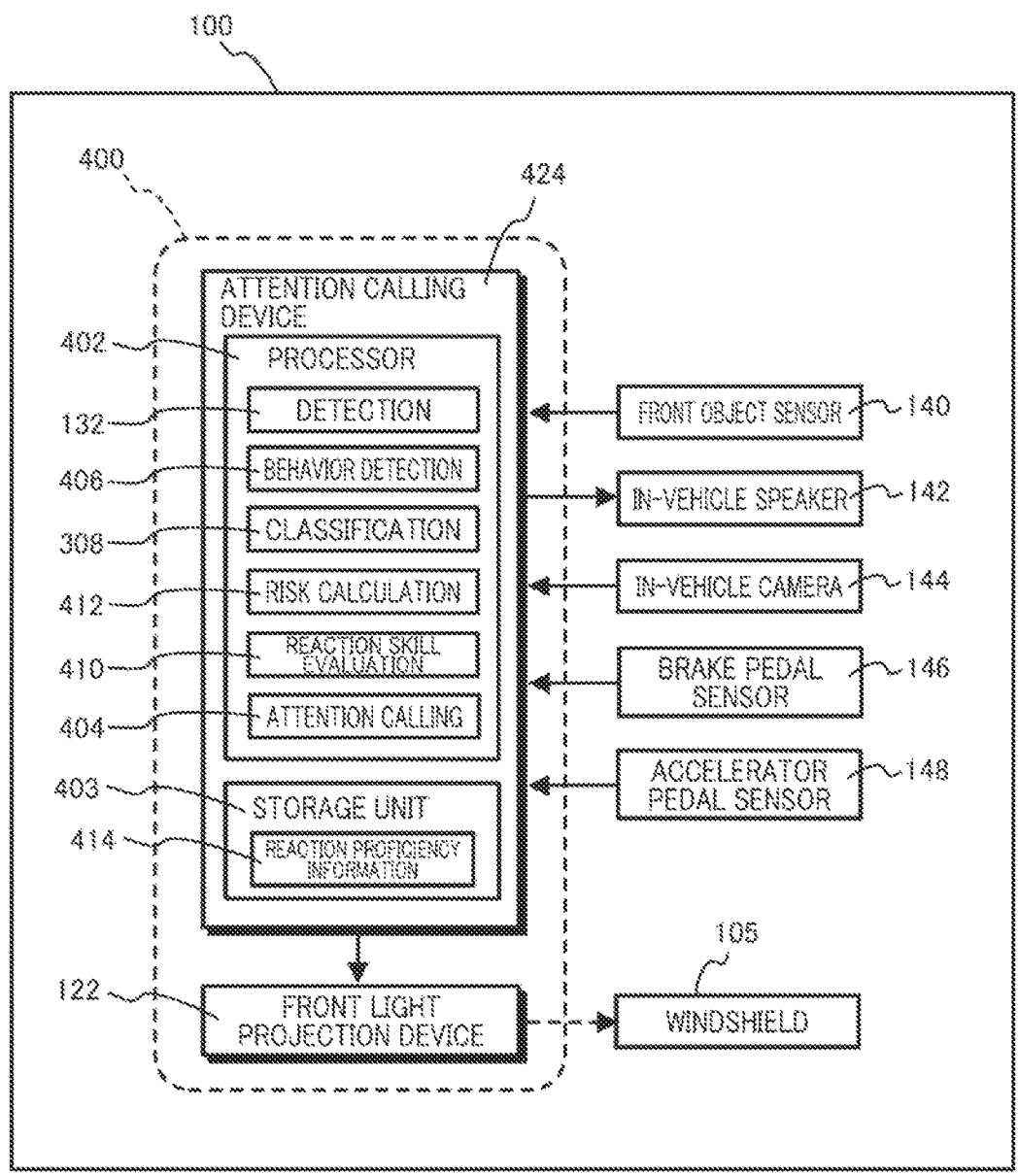
FIG. 9 illustrates a structure of an attention calling system according to a third embodiment of the present invention.

A third embodiment of the present invention will be described. FIG. 9 illustrates a structure of an attention calling system 400 according to the third embodiment of the present invention. In place of the attention calling system 120, the attention calling system 400 is installed in the vehicle 100 as described in the first embodiment referring to FIG. 1. The components shown in FIG. 9, which are the same as those shown in FIGS. 2 and 5 will be designated with the same codes in FIGS. 2 and 5, and explanations referring to FIGS. 2 and 5 will apply correspondingly.

The attention calling system 400 includes the front light projection device 122 for outputting the visual display onto the windshield 105, which can be visually recognized by the operator, and an attention calling device 424 for controlling the front light projection device 122 to call the operator's attention to the object by means of the visual display.

The attention calling device 424 has its structure similar to that of the attention calling device 324 as illustrated in FIG. 5 except that a processor 402 and a storage unit 403 are provided in place of the processor 302 and the storage unit 303. The storage unit 403 has its structure similar to that of the storage unit 303, and stores reaction proficiency information 414 using a reaction skill evaluation unit 410 of the processor 402 to be described later.

The processor 402 has its structure similar to that of the processor 302 except that an attention calling unit 404 and a behavior detection unit 406 are provided each as the functional element or the functional unit in place of the attention calling unit 304 and the behavior detection unit 306. Unlike the processor 302, the processor 402 does not include the cognition skill evaluation unit 310 but includes the reaction skill evaluation unit 410 and a risk calculation unit 412.

Like the processor 302, the functional elements of the processor 402 are implemented through execution of the program by the processor 402 as the computer. The computer program can be stored in an arbitrary computer-readable storage medium. Alternatively, it is possible to form all or part of the functional elements of the processor 402 into hardware devices each including one or more electronic circuit components.

The risk calculation unit 412 calculates a risk value indicating a degree of risk of contact between the vehicle 100 and each of the objects detected by the detection unit 132 based on the category of the object classified by the classification unit 308. The risk value is different from the contact probability calculated based on at least the relative speed of each object detected by the detection unit 132 to the vehicle 100. For example, the actual accidents are divided into the categories as described above, and the ratio of the number of accidents for each category to the total number of accidents is compared with a given threshold value range so that the risk value is obtained by correlating the ratio to a multi-stage evaluation value. In the embodiment, the risk value is evaluated in 10 stages. The risk value 1 denotes the lowest accident occurrence probability, and the risk value 10 denotes the highest accident occurrence probability.

The risk calculation unit 412 is configured to calculate the respective risk values of the detected objects with reference to the risk information indicating the risk value for each category preliminarily stored in the storage unit 403. Alternatively, the risk calculation unit 412 utilizes a learned risk calculation model derived from machine learning with respect to the relation between the category of the object as the risk calculation target and the accident probability of the categorized object so that the risk value with respect to the category of the object is calculated.

Like the behavior detection unit 306, the behavior detection unit 406 detects movements of the visual line and the face direction of the operator using the in-vehicle camera 144, and determines whether or not the operator has visually recognized the object. Specifically, when the time for which the operator's visual line has been retained on the object exceeds the given time, the behavior detection unit 406 determines that the operator has visually recognized the object.

The behavior detection unit 406 measures an actual reaction time taken for the operator to start the specific operation of the vehicle 100 from visual recognition of the object detected by the detection unit 132. In the embodiment, the behavior detection unit 406 detects the specific operation, that is, the operation of the brake pedal or the accelerator pedal using a brake pedal sensor 146 or an accelerator pedal sensor 148.

The reaction skill evaluation unit 410 subtracts a standard reaction time predetermined for the classified category of each object detected by the detection unit 132 from the actual reaction time measured by the behavior detection unit 406 to calculate a reaction delay time for each object. The reaction skill evaluation unit 410 calculates the operator's reaction proficiency value with respect to the category based on the calculated reaction delay time, and stores the reaction proficiency value for each category in the storage unit 403 as the reaction proficiency information 414.

The reaction proficiency value is evaluated in 5 stages. As the reaction delay time (including a negative value) becomes shorter, the reaction proficiency value takes a smaller value. For example, the reaction skill evaluation unit 410 allows the calculated reaction delay time to be associated with any one of the reaction proficiency values from 0 to 4 using the predetermined set of threshold values.

Like the attention calling unit 133 as illustrated in FIG. 2, the attention calling unit 404 controls the front light projection device 122 to output the visual display VI in the horizontally extending belt-like display range HA on the windshield 105 of the vehicle 100. Unlike the attention calling unit 133, the attention calling unit 404 displays the visual display VI indicating each direction position of the objects detected by the detection unit 132 in the display range HA on the windshield 105 at least in the mode adapted to the risk value with respect to the object, which has been calculated by the risk calculation unit 412.

The attention calling unit 404 displays the visual display VI of the categorized object in the mode that makes visual attractivity higher as the risk value of the category becomes closer to the value 10. In this case, the expression of "display in the mode that makes visual attractivity higher" represents that as the risk value is increased from 1 to 10, the hue of the visual display VI is sequentially changed from cool to warm color so as to be more conspicuous. It is possible to use not only the hue but also brightness (color tone), flickering speed, size, or the like as the mode for the visual display VI adapted to the cognition proficiency value.

Specifically, the attention calling unit 404 expresses 10 colors varying from the cool to warm colors in 10-color codes taking values from 1 to 10, respectively. The attention calling unit 404 associates each of the risk values from 1 to 10, which have been calculated for the category of the detected object with the color code that takes the same value. The visual display VI of the object is displayed using the color corresponding to the associated color code. The relation between the color code and the color may be defined as described below. For example, in association with increase in the color code from 1 to 10 stepwise, the visual display VI is variously colored in purple, bluish purple, blue, blue-green, green, yellowish green, yellow, orange-yellow, and red, correspondingly.

The object with higher risk value is displayed as the visual display VI with higher visual attractivity. Accordingly, the operator's visual line can be guided to the object with higher risk value.

In the embodiment, the attention calling unit 404 determines the display mode of the visual display VI considering the operator's reaction skill for each category of the object in addition to the risk value. Specifically, the attention calling unit 404 refers to the reaction proficiency information 414 with respect to the operator, which has been stored in the storage unit 403 by the reaction skill evaluation unit 410 for displaying the visual display VI of the object in the display range HA.

The attention calling unit 404 calculates a danger value by adding the operator's reaction proficiency value (in the embodiment, taking the value from 0 to 4 as described above) with respect to the category of the object indicated by the reaction proficiency information to the risk value. The attention calling unit 404 displays the visual display VI of the object in color corresponding to the color code with the same value as the calculated danger value. The visual display VI of the object with the calculated danger value in excess of the value 10 can be displayed in color corresponding to the color code with maximum value of 10.

After displaying the visual display VI of each detected object in the thus determined display mode (display color in this embodiment), if it is determined that the operator has not visually recognized the object, the attention calling unit 404 raises the visual attractivity level of the visual display VI of the object with time.

Specifically, the attention calling unit 404 measures the time elapsing from display of the visual display VI of the object, and incrementally changes its color to the one corresponding to the color code one step higher than the current color code every passage of the given time (for example, 1 second) so that the visual attractivity of the visual display VI is raised. Increase in the visual attractivity level of the visual display VI is stopped when the color code is increased up to the maximum value 10, or the behavior detection unit 406 detects the operator's visual recognition of the object.

Figure 10:
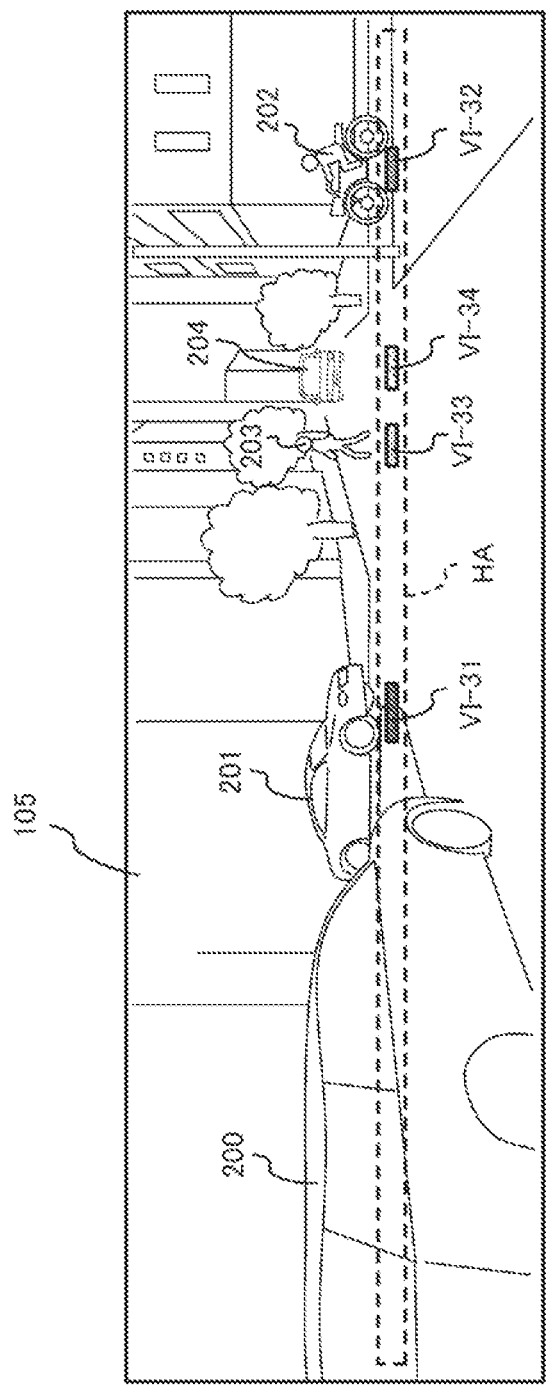
FIG. 10 illustrates an example of visual displays on the windshield, which are displayed by the attention calling system as illustrated in FIG. 9.

FIG. 10 illustrates an example of the visual displays VI on the windshield 105, which are displayed by the attention calling unit 404. The traffic scene and categorization of the objects in the area to the front of the vehicle 100 as illustrated in FIG. 10 are similar to those of the example as illustrated in FIG. 7. FIG. 10 represents the state immediately after starting display of the visual displays VI of the respective objects. Colors of the visual displays VI of the respective objects, that is, the visual displays VI-31, VI-32, VI-33, and VI-34 corresponding to the vehicle 201, the motorbike 202, the pedestrian 203, and the vehicle 204 are determined based on the risk values given to the categories of the vehicle 201, the motorbike 202, the pedestrian 203, and the vehicle 204. Referring to the example of FIG. 10, the danger values, for example, 9, 4, 6, 6 obtained by adding the risk value to the reaction proficiency value are given to the classified categories of the vehicle 201, the motorbike 202, the pedestrian 203, and the vehicle 204, respectively. Correspondingly, the visual displays VI-31, VI-32, VI-33, and the VI-34 are displayed in colors of orange, blue-green, yellowish green, and yellowish green, respectively.

Figure 11:
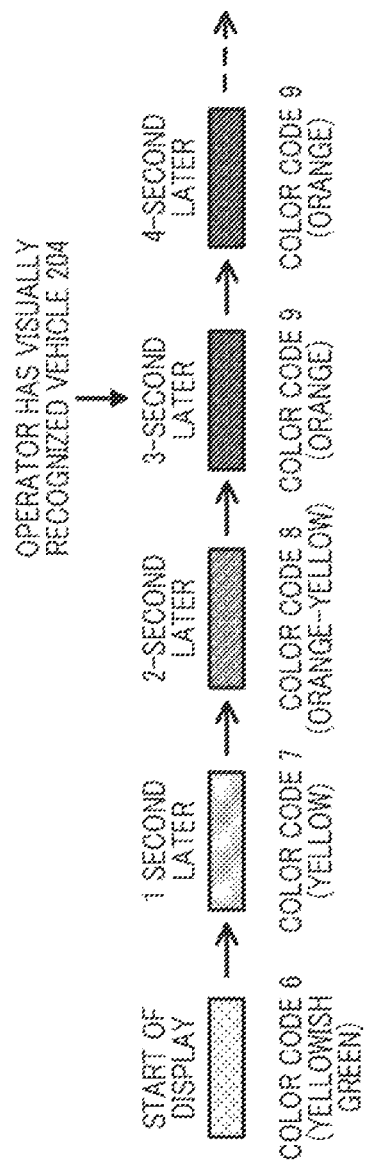
FIG. 11 represents an example of time-dependent change in the visual display as illustrated in FIG. 10.

Each color of the visual displays VI-31, VI-32, VI-33, VI-34 will be changed with time until the operator visually recognizes the vehicle 201, the motorbike 202, the pedestrian 203, and the vehicle 204 corresponding to those visual displays, respectively. FIG. 11 represents an example of change in the mode for displaying the visual display VI-34 of the vehicle 204 with the elapse of time for which the vehicle 204 has been kept visually unrecognized by the operator.

FIG. 11 illustrates the visual display VI-34 to be displayed in the display range HA transitionally from the left to the right. The visual display VI-34 represents the respective states at the start of the display, 1-second later, 2-second later, 3-second later, and 4-second later. Referring to FIG. 11, it is assumed that the operator has visually recognized the vehicle 204 corresponding to the visual display VI-34 after the elapse of 3 seconds from the start of display.

As the danger value of the vehicle 204 is 6 (as described above), the color code of the visual display VI-34 at the start of display is 6 (yellowish green). Then the attention calling unit 404 changes the color of the visual display VI-34 to the one corresponding to the color code with the number one step higher than the current number at every second. The color will be changed to the one corresponding to the color code 7 (yellow) after the elapse of 1 second, the one corresponding to the color code 8 (orange-yellow) after the elapse of 2 seconds, and the one corresponding to the color code 9 (orange) after the elapse of 3 seconds. After the elapse of 3 seconds, the attention calling unit 404 stops incrementing the color code of the visual display VI-34 in response to the operator's visual confirmation of the vehicle 204. As a result, after the elapse of 4 seconds onward, the visual display VI-34 is kept displayed in color corresponding to the color code 9 (orange).

Like the attention calling system 120, the above-configured attention calling system 400 displays the visual display VI at the horizontal position corresponding to the object in the belt-like display range HA on the windshield 105. Like the attention calling system 120, the attention calling system 400 is capable of calling the operator's attention to various traffic participants existing in the environment surrounding the vehicle 100 without distracting the operator's attention.

The attention calling system 400 displays the visual display VI of the object at least in the mode adapted to the risk value of the category of the object. The attention calling system 400 allows the operator to visually recognize the respective objects with priority in accordance with the risk value of contact with the vehicle 100. This makes it possible to call the operator's attention to various objects existing in the environment surrounding the vehicle 100 in the mode more effective for the operator to take the operating action. In the attention calling system 400, the mode for displaying the visual display VI of the object is determined based on the operator's reaction proficiency value with respect to the category of the object. The attention calling system 400 indicates existence of the object that makes the operator's actual reaction time from the visual recognition to the operating action longer than the standard reaction time by means of the visual display VI with higher visual attractivity. This makes it possible call the operator's attention to various objects existing in the environment surrounding the vehicle 100 with priority in accordance with the operator's reactive operation speed.

If it is determined that the operator has not visually recognized the object, the attention calling unit 404 of the attention calling system 400 raises the visual attractivity level of the visual display VI of the object with time (the display color is changed to make it appear warmer in the embodiment). The attention calling system 400 prevents the elapse of long time for which the object is kept visually unrecognized by the operator. As a result, the attention calling system avoids the operator's delay in taking action on the appearing object.

The attention calling system 400 is configured to determine that the operator has visually recognized the object when the time for which the operator's visual line has been retained on the object exceeds the given time. Presence/absence of visual recognition of the object can be determined by executing the simplified process.

Figure 12:
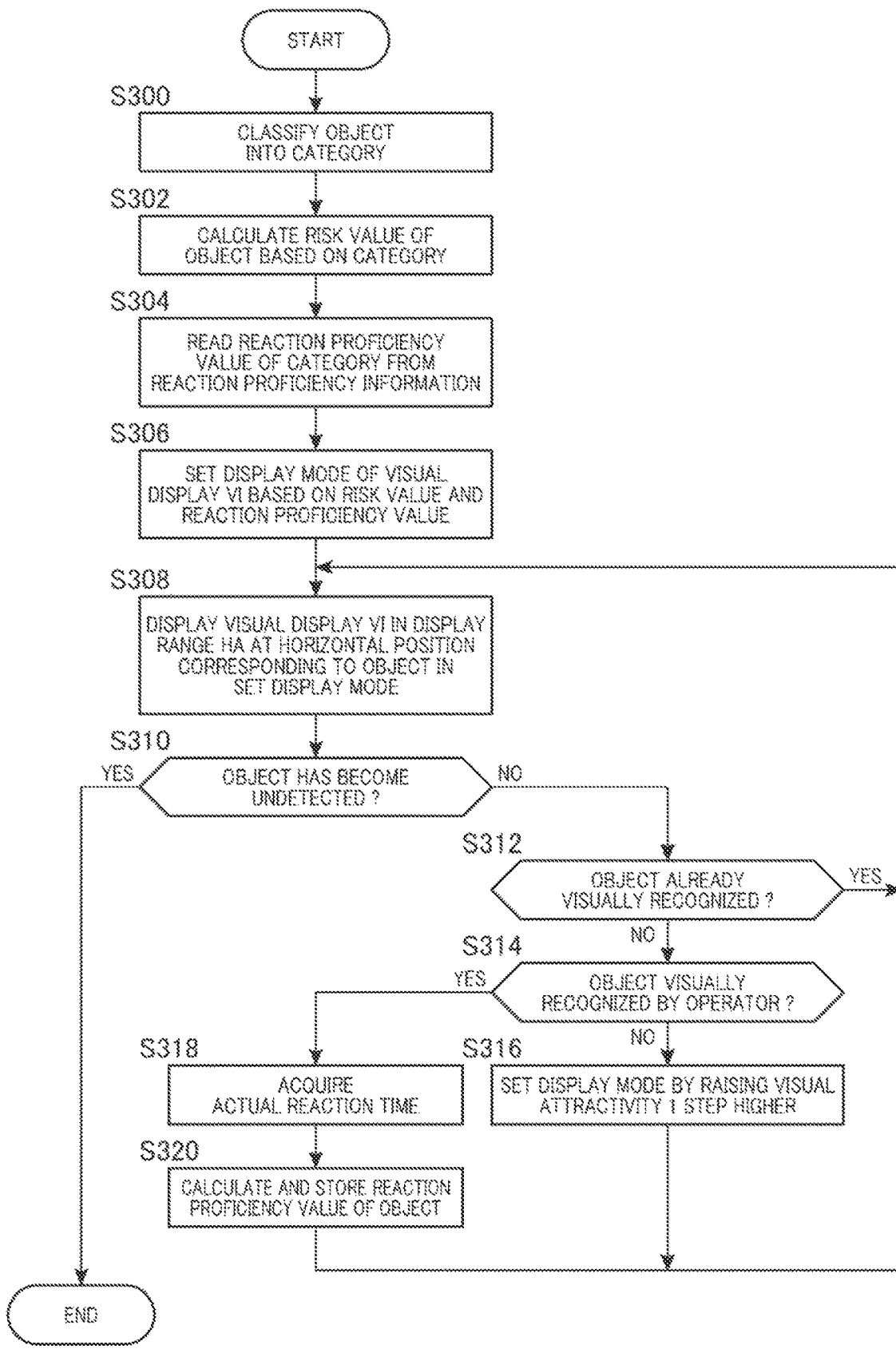
FIG. 12 is a flowchart representing an operation procedure executed by the attention calling system as illustrated in FIG. 9.

FIG. 12 is a flowchart representing an operation procedure executed by the attention calling system 400. When the detection unit 132 as illustrated in FIG. 9 detects at least one object, the process shown in FIG. 12 is started for each of the detected objects.

Upon start of the process, the classification unit 308 classifies the detected object into the category (S300). The risk calculation unit 412 calculates the risk value based on the classified category of the object (S302).

The attention calling unit 404 reads the reaction proficiency value with respect to the category of the object with reference to the reaction proficiency information 414 stored in the storage unit 403 (S304). The attention calling unit 404 sets the display mode for displaying the visual display VI of the object based on the risk value and the reaction proficiency value (S306). The attention calling unit 404 displays the visual display VI at the horizontal position corresponding to the object in the display range HA in the mode set as described above (S308).

The attention calling unit 404 determines whether or not the object has become undetected to the detection unit 132 (S310). If the object has become undetected (YES in S310), the attention calling unit 404 terminates the process.

If the object is continuously detected (NO in S310), the attention calling unit 404 determines whether or not the object has been visually recognized (S312). If the object has been already visually recognized (YES in S312), the attention calling unit 404 returns to step S308 for executing the process repeatedly without changing setting of the display mode of the visual display VI.

If the object has not been visually recognized yet (NO in S312), the attention calling unit 404 determines whether or not the operator has visually recognized the object based on the operator's visual line movement detected by the behavior detection unit 406 (S314). If the operator has not visually recognized the object (NO in S314), the attention calling unit 404 sets the display mode of the visual display VI by raising its visual attractivity one step higher than that of the current display mode (S316). The process then returns to step S308 for executing the process repeatedly. As described above, in this embodiment, the display color for the visual display VI is changed to make it appear warmer (red, for example) to raise the visual attractivity of the display mode of the visual display VI one step higher.

If the operator has visually recognized the object in step S314 (YES in S314), the reaction skill evaluation unit 410 acquires the actual reaction time measured by the behavior detection unit 406 (S318). The reaction skill evaluation unit 410 calculates the reaction proficiency value with respect to the object using the acquired actual reaction time, and associates the calculated reaction proficiency value with the category of the object, which is added to the reaction proficiency information 414 stored in the storage unit 403 (S320). The processor 402 then returns to step S308 for executing the process repeatedly without changing setting of the display mode of the visual display VI.

Fourth Embodiment

Figure 13:
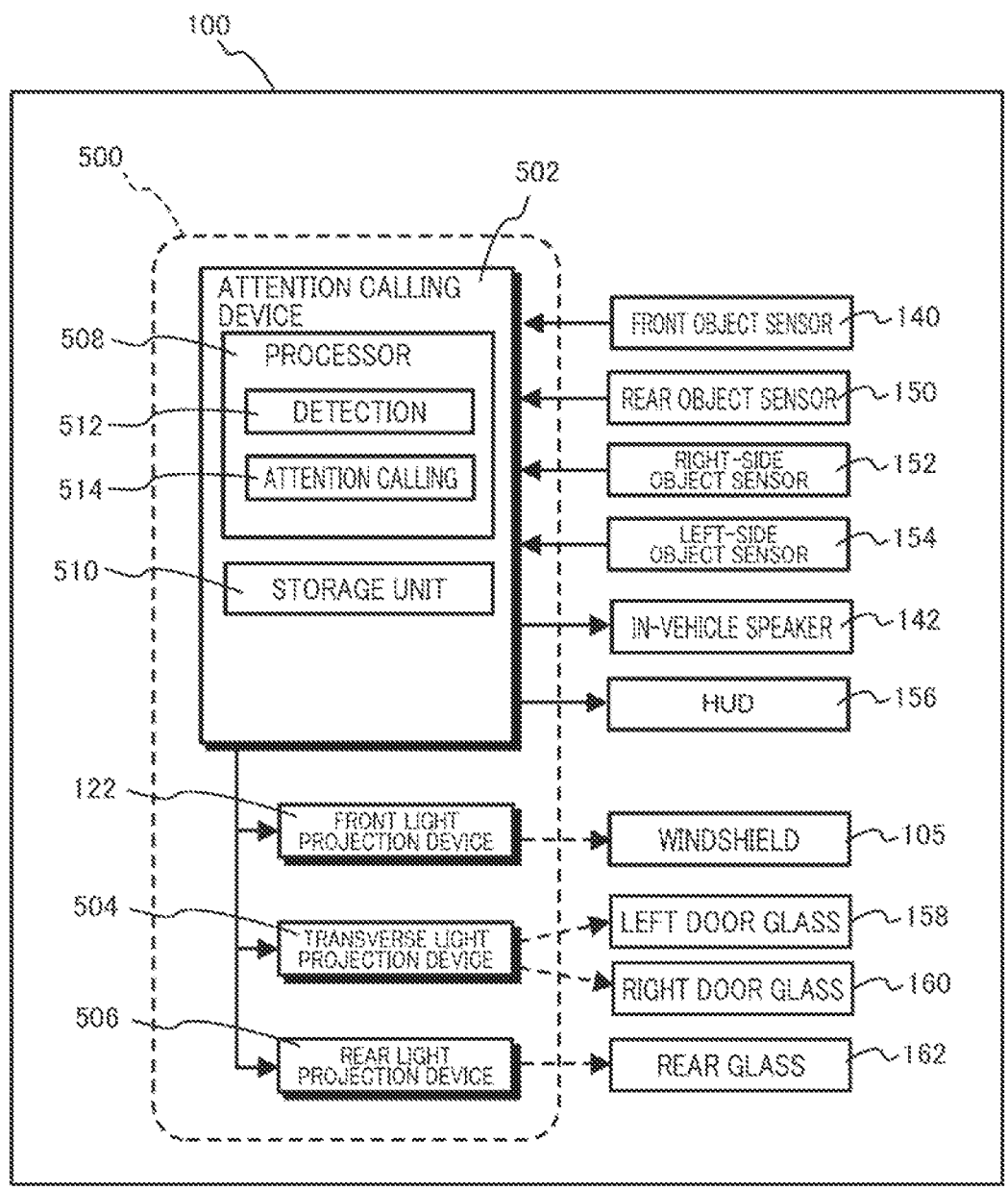
FIG. 13 illustrates a structure of an attention calling system according to a fourth embodiment of the present invention.

A fourth embodiment of the present invention will be described. FIG. 13 illustrates a structure of an attention calling system 500 according to the fourth embodiment of the present invention. The attention calling system 120 of the first embodiment described above is configured to guide the operator's visual line to the object existing to the front of the vehicle 100. Meanwhile, the attention calling system 500 of this embodiment is configured to notify the operator of the object existing in the area around the vehicle 100 as the center omnidirectionally at 360°.

The components shown in FIG. 13, which are the same as those shown in FIG. 2 will be designated with the same codes in FIG. 2, and explanations referring to FIG. 2 will apply correspondingly.

The attention calling system 500 includes the front light projection device 122 for outputting the visual display onto the interior structure of the vehicle 100, which can be visually recognized by the operator of the vehicle 100, a transverse light projection device 504, a rear light projection device 506, and an attention calling device 502 for controlling those light projection devices to call the operator's attention to the object existing around the vehicle 100 by means of the visual display.

Figure 14:
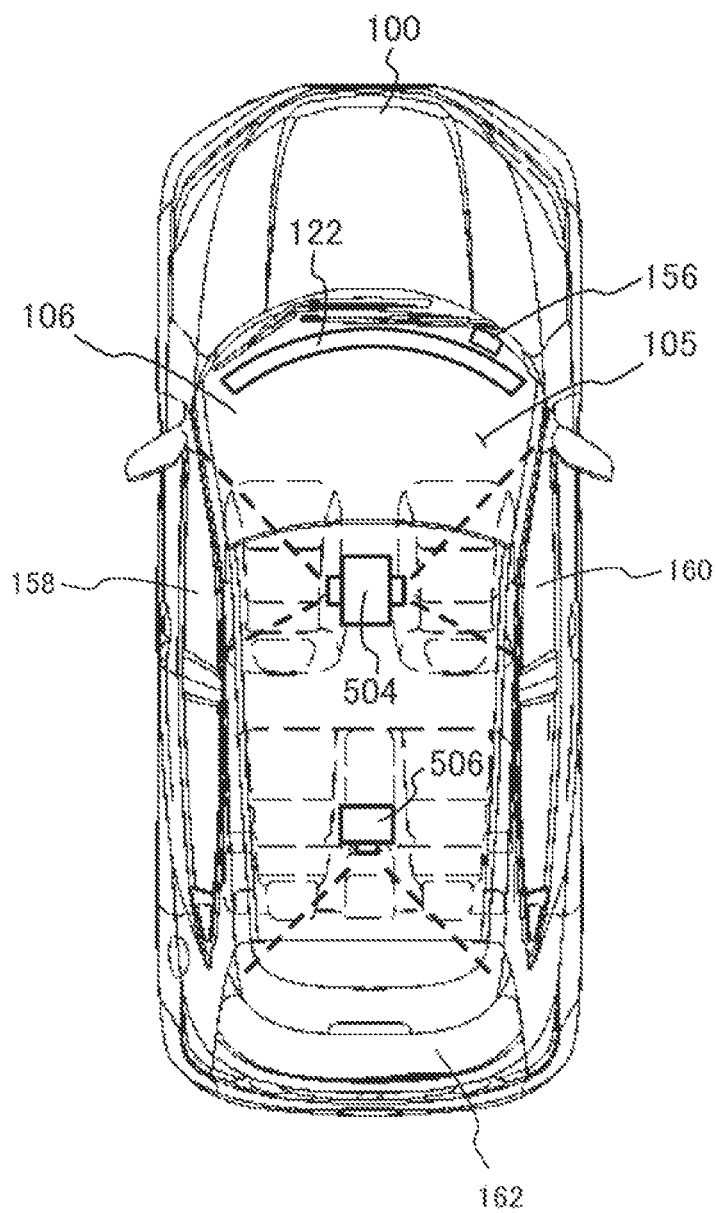
FIG. 14 illustrates an arrangement example of light projection devices inside a vehicle installed with the attention calling system as illustrated in FIG. 13.

FIG. 14 illustrates an example of arrangement of the light projection devices inside the vehicle 100. Referring to FIG. 14, the components shown in FIG. 14, which are the same as those shown in FIG. 1 will be designated with the same codes in FIG. 1, and explanations referring to FIG. 1 will apply correspondingly.

An instrument panel 106 at the front in the vehicle interior is provided with the front light projection device 122. The front light projection device 122 as described referring to FIG. 1 displays the visual display VI in the display range HA on the windshield 105 as the interior structure. The instrument panel 106 also includes a HUD (head-up display) 156 for display on the windshield 105 in accordance with the generally employed technique.

The transverse light projection device 504 and the rear light projection device 506 are disposed at the inner front side (front in the vehicle interior) and the inner rear side of the roof of the vehicle 100, respectively. Each of the transverse light projection device 504 and the rear light projection device 506 may be formed as a projector. The transverse light projection device 504 and the rear light projection device 506 project the visual displays onto the interior structures at the right and left sides, and the rear side of the vehicle 100 in the predetermined display ranges, respectively. In the embodiment, the transverse light projection device 504 projects light to a left door glass 158 and a right door glass 160 each as the interior structure. The rear light projection device 506 projects light to a rear glass 162 as the interior structure. If the vehicle 100 includes front ventilation windows at the left and right sides, they can be regarded as the interior structures to which the visual display is output by the transverse light projection device 504.

For example, like the front light projection device 122 as illustrated in FIG. 1 for visual display in the display range HA on the windshield 105, the transverse light projection device 504 and the rear light projection device 506 display the visual displays on the interior structures in the predetermined display range, that is, the horizontally extending belt-like range orthogonal to the vehicle height direction of the vehicle 100.

Like the visual display VI to be displayed on the windshield 105 by the front light projection device 122, the transverse light projection device 504 and the rear light projection device 506 project the predetermined-sized light onto the interior structures as the visual display. Correspondingly, the visual display projected onto the interior structures by the transverse light projection device 504 and the rear light projection device 506 will be referred to as the visual display VI. Referring to FIG. 13, the attention calling device 502 includes a processor 508 and a storage unit 510. The storage unit 510 is constituted by the volatile or nonvolatile semiconductor memory, and/or a hard disk device, for example. The processor 508 is a computer having such processor as CPU. The processor 508 may be provided with ROM to which programs have been written, RAM for temporal storage of data, and the like. The processor 508 includes a detection unit 512 and an attention calling unit 514 each as a functional element or a functional unit.

Those functional elements of the processor 508 are implemented through execution of the program by the processor 508 as the computer. The computer programs can be stored in an arbitrary computer-readable storage medium. Alternatively, it is possible to form all or part of the functional elements of the processor 508 into hardware devices each including one or more electronic circuit components.

The detection unit 512 detects the object in the area surrounding the vehicle 100. Specifically, the detection unit 512 allows the front object sensor 140, a rear object sensor 150, a right-side object sensor 152, and a left-side object sensor 154, which are installed in the vehicle 100 to detect objects in the front area, the rear area, the right-side area, and the left-side area around the vehicle 100, respectively. The rear object sensor 150, the right-side object sensor 152, and the left-side object sensor 154 may be in the form of a camera, a laser, and/or a lidar like the front object sensor 140.

The detection unit 512 acquires video images of the front area, rear area, right-side area, and left-side area around the vehicle 100 from the front object sensor 140, the rear object sensor 150, the right-side object sensor 152, and the left-side object sensor 154, respectively. The detection unit 512 detects the predetermined real objects from the acquired video images. If one of those real objects has the probability of contact with the vehicle 100 equal to or larger than a given value, which has been calculated from the relative speed to the vehicle 100, the real object is detected as the object. Like the first embodiment, the predetermined real object corresponds to the traffic participants including the vehicle and the pedestrian, and obstacles. The detection unit 512 transmits each piece of position information of the detected objects to the attention calling unit 514.

It is possible to dispose the front object sensor 140, the rear object sensor 150, the right-side object sensor 152, and the left-side object sensor 154 on a front bumper, a rear bumper, a right fender mirror body, and a left fender mirror body of the vehicle 100, respectively.

The attention calling unit 514 notifies the operator of the direction of the object existing in the area surrounding the vehicle 100, which has been detected by the detection unit 512 by means of the visual display. Specifically, the attention calling unit 514 controls the front light projection device 122, the transverse light projection device 504, and the rear light projection device 506 to output the visual display VI at the horizontal position corresponding to the direction of the object seen from the operator's position in the predetermined display range on the interior structure of the vehicle 100.

Specifically, the circumferential area of the vehicle 100 is divided into multiple angular areas. The visual display VI is output from the front light projection device 122, the transverse light projection device 504, or the rear light projection device 506 depending on the area in the presence of the object detected by the detection unit 512.

Figure 15:
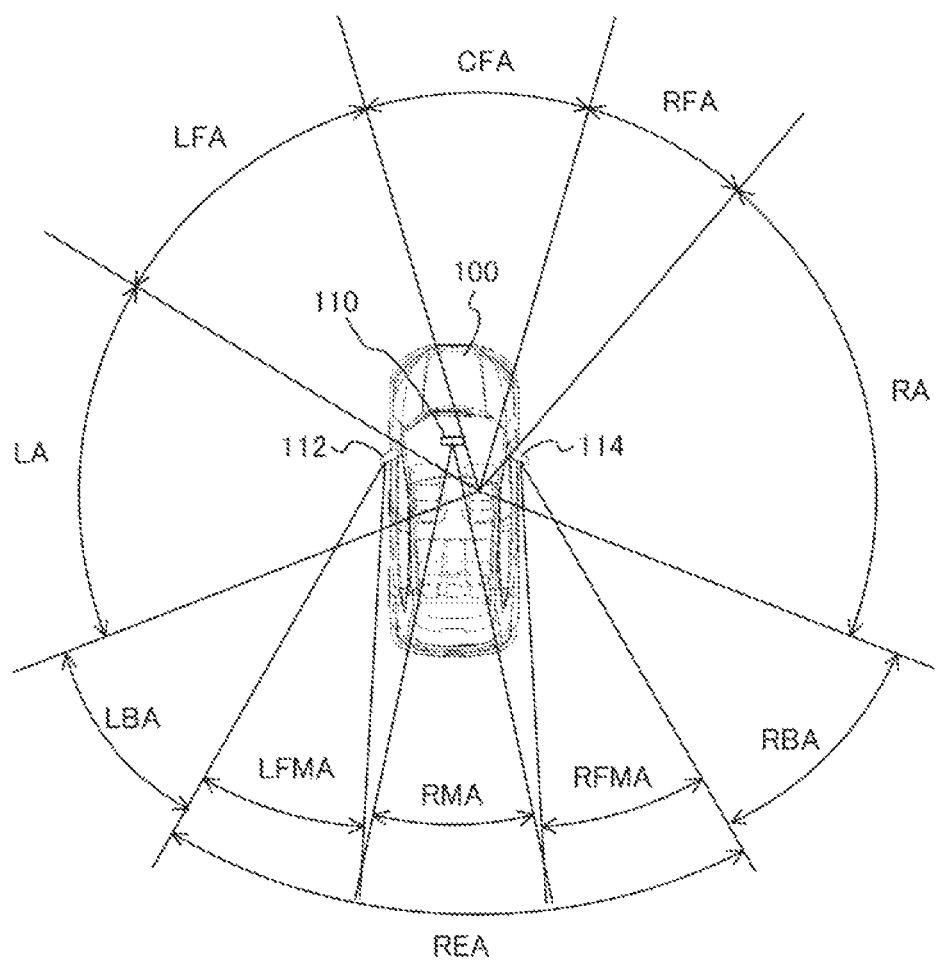
FIG. 15 illustrates an example of angular areas around the vehicle as the center, which are defined by the attention calling system as illustrated in FIG. 13.

FIG. 15 illustrates an example of angular areas surrounding the vehicle 100 as a center. The components shown in FIG. 15, which are the same as those shown in FIG. 1 will be designated with the same codes in FIG. 1, and explanations referring to FIG. 1 will apply correspondingly.

Referring to the example of FIG. 15, a center front area CFA is defined as the area which can be visually recognized by the operator seated on the operator's seat of the vehicle 100 while having the operator's face kept directed forward. A left front area LFA and a right front area RFA are defined as areas which can be visually recognized by the operator while having the operator's face directed leftward and rightward at approximately 45°. In the example of FIG. 15, a left-side area LA and a right-side area RA of the vehicle 100 are also defined as areas which can be visually recognized while having the operator's waist lightly twisted leftward or rightward.

Referring to the example of FIG. 15, a rear area REA is defined as the area which can be visually recognized by the operator by means of the rearview mirror 110, the left fender mirror 112, and the right fender mirror 114. The rear area REA is subdivided into a rearview mirror area RMA which can be visually recognized by the operator by means of the rearview mirror 110, a left fender mirror area LFMA which can be visually recognized by the operator by means of the left fender mirror 112, and a right fender mirror area RFMA which can be visually recognized by the operator by means of the right fender mirror 114.

The rest of the area as illustrated in FIG. 15 includes a left blind spot area LBA and a right blind spot area RBA as areas where the operator cannot visually recognize the object.

Like the attention calling unit 133 of the first embodiment, the attention calling unit 514 allows the front light projection device 122 to display the visual displays VI indicating each direction of the objects in the center front area CFA, the left front area LFA, and the right front area RFA, which have been detected by the detection unit 512 in the display range HA on the windshield 105.

Additionally, the attention calling unit 514 allows the transverse light projection device 504 to display the visual displays VI indicating directions of the objects in the left-side area LA and the right-side area RA, which have been detected by the detection unit 512 on the left door glass 158 and the right door glass 160, respectively.

The attention calling unit 514 allows the rear light projection device 506 to display the visual display VI indicating the direction of the object in the rear area REA, which has been detected by the detection unit 512 on the rear glass 162.

Besides the left blind spot area LBA and the right blind spot area RBA as areas where the operator cannot visually recognize the object, the attention calling unit 514 notifies the operator of direction of the object which may possibly come into contact with the vehicle 100 among those existing in substantially entire circumferential area of the vehicle 100. This makes it possible to call the operator's attention, and guide the operator's visual line.

The attention calling unit 514 displays a ring-shaped display indicating the direction from the vehicle 100 on the display unit. The attention calling unit 514 outputs the visual display to an arc part of the ring-shaped display corresponding to the object direction. In this embodiment, the display unit is in the form of the HUD 156.

Specifically, the attention calling unit 514 displays the radar-like display screen indicating direction of the object detected by the detection unit 512 in the entire circumferential area of the vehicle 100 including the left blind spot area LBA and the right blind spot area RBA on the HUD 156. The radar-like display screen displayed on the HUD 156 for indicating the object direction by the attention calling unit 514 will be referred to as an object radar display.

Figure 16:
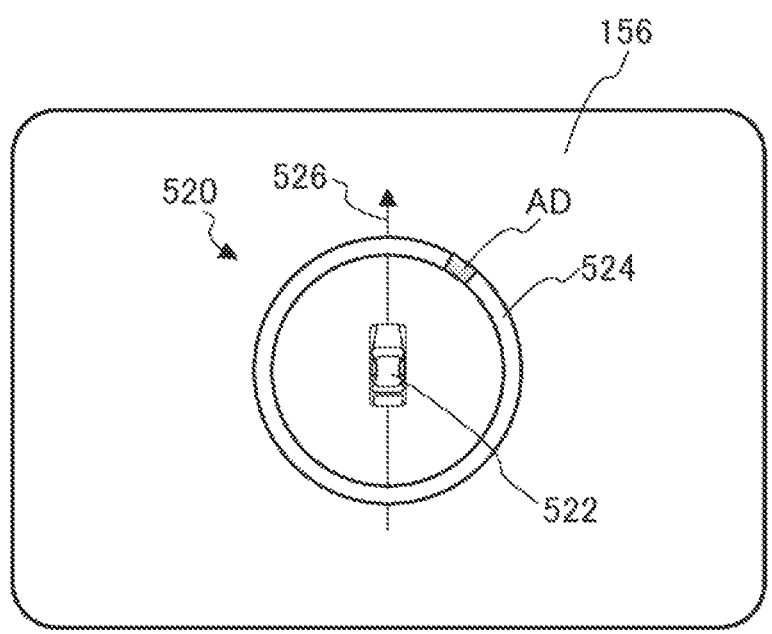
FIG. 16 illustrates an example of an object radar display on a HUD of the attention calling system as illustrated in FIG. 13.

FIG. 16 illustrates an example of the object radar display to be displayed on the HUD 156 by the attention calling unit 514. The object radar display 520 includes a vehicle icon 522 indicating the vehicle 100, and a ring-shaped display 524 omnidirectionally indicating an entire circumferential area of the vehicle 100 as the center at 360°. The attention calling unit 51 outputs the visual display corresponding to the object direction to the arc part of the ring-shaped display 524. Specifically, the attention calling unit 514 displays a visual display AD in the arc part of the ring-shaped display 524, which corresponds to the direction of the object detected by the detection unit 512. An upward arrow 526 displayed on the ring-shaped display 524 in FIG. 16 indicates a straight-running direction of the vehicle 100. The arrow 526 is provided only for explanation purpose in the embodiment, but can be provided to partially constitute the object radar display 520.

In the example of FIG. 16, the visual display AD is shown as the arc part of the ring-shaped display 524 at an angle of approximately 30° to the right from the straight-running direction (direction indicated by the arrow 526) of the vehicle icon 522. The visual display AD indicates the object at the right front side of the vehicle 100 at approximately 30°, which has a possibility to come into contact with the vehicle 100.

Figure 17:
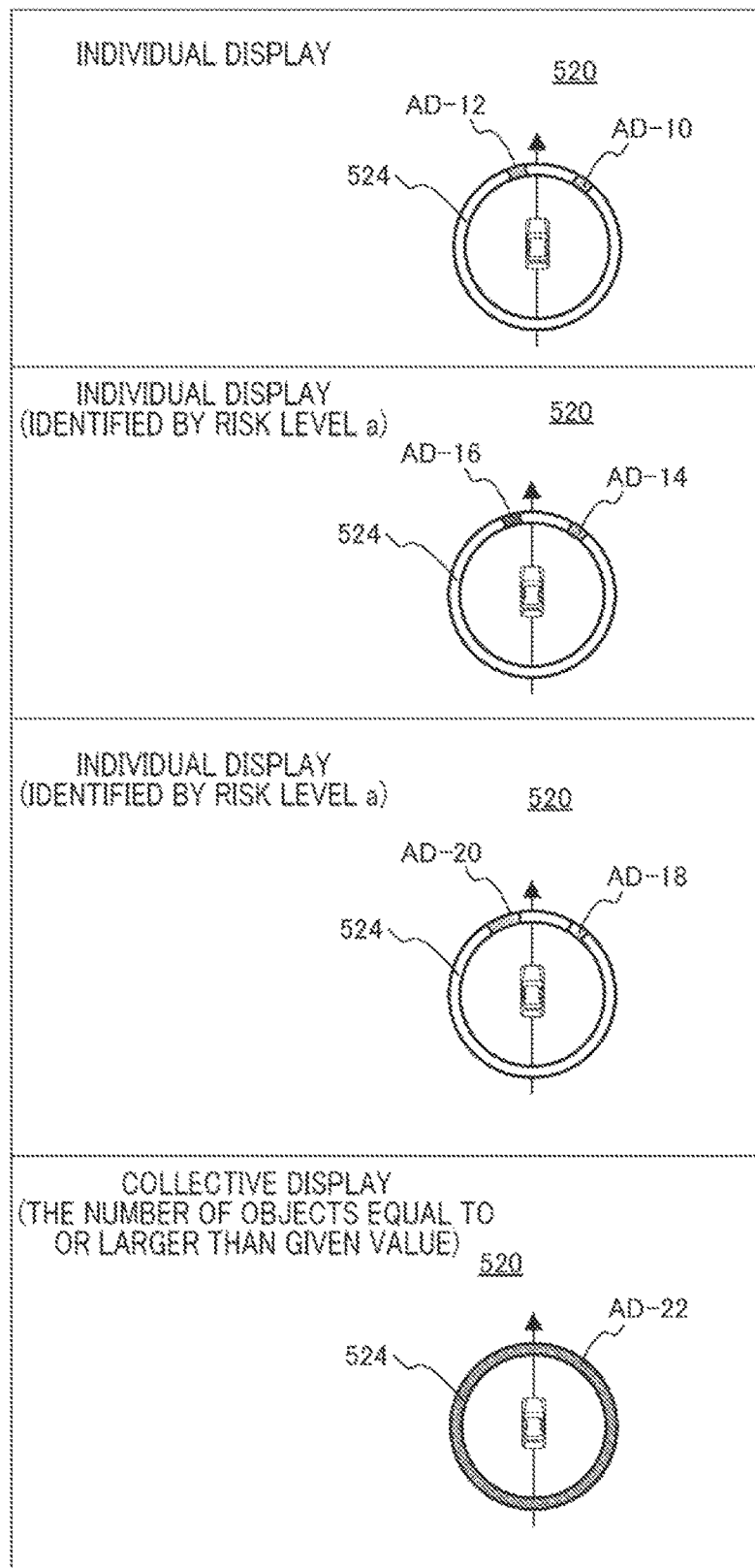
FIG. 17 illustrates examples of various display modes of the object radar display.

FIG. 17 is a table showing various display modes of the object radar display 520 to be displayed by the attention calling unit 514. The first stage (uppermost stage) of the table in FIG. 17 illustrates an exemplary case that each of the detected objects is displayed individually in the same visual display mode. In the illustrated example, the visual displays AD-10 and AD-12 displayed on the ring-shaped display 524 indicate existence of objects in areas at the right angular position of 30°, and at the left angular position of 15° to the vehicle 100, respectively.

An example of the second stage of the table of FIG. 17 indicates visual displays of multiple objects individually displayed like the example illustrated in the first stage. Each of the visual displays is displayed in the mode adapted to the risk degree of the corresponding object. For example, each of the objects is displayed in the color in accordance with the contact probability with the vehicle 100. In the illustrated example, for example, the visual display AD-14 is displayed in green, and the visual display AD-16 is displayed in yellow. The contact probability with the vehicle 100 can be calculated from the relative speed of the object detected by the detection unit 512 to the vehicle 100. The attention calling unit 514 is allowed to determine the color for visually displaying the detected object based on the predetermined correlation information indicating the correlation between the calculated relative speed range and the display color used for the visual display.

An example of the third stage of the table of FIG. 17 indicates visual displays of multiple objects individually displayed each in the mode adapted to the risk degree like the example illustrated in the second stage. Unlike the example illustrated in the second stage, in the third stage, the risk degree is expressed by size of the visual display rather than color of the visual display. In the illustrated example, for example, each of the visual displays AD-18 and AD-20 is expressed as a band-like arc at central angle of approximately 10° and 20°, respectively. The object expressed as the larger visual display AD-20 indicates the one having its contact probability higher than that of the object expressed as the smaller visual display AD-18. For example, the contact probability with the vehicle 100 can be calculated from the relative speed of the object detected by the detection unit 512 to the vehicle 100. The attention calling unit 514 is allowed to determine the size of the visual display of the detected object based on the predetermined correlation information indicating the correlation between the range of the calculated contact probability and the central angle of the band-like arc used for the visual display.

An example of the fourth stage (lowermost) of the table of FIG. 17 indicates that upon detection of the objects equal to or more than the given value in the area surrounding the vehicle 100, the visual display of those objects will be displayed over the entire circumference of the ring-shaped display 524. In the illustrated example, for example, the visual display AD-22 extends over the entire circumference of the ring-shaped display 524 to notify that the objects more than the given value, that is, 3 or more objects have been detected in the area surrounding the vehicle 100. The given value may be set to an arbitrary value without being limited to 3. The visual display AD-22 may be displayed in the color corresponding to the highest contact probability of the object among the contact probabilities of the detected objects.

Like the attention calling system 120, the above-configured attention calling system 500 displays the visual display VI at the horizontal position corresponding to the object in the belt-like display range HA on the windshield 105. Like the attention calling system 120, the attention calling system 500 is capable of calling the operator's attention to various traffic participants existing in the environment surrounding the vehicle 100 without distracting the operator's attention.

The attention calling system 500 displays the visual display VI indicating directions of the objects existing in the lateral and rear sides of the vehicle 100, which are seen from the operator in the horizontally extending display range on the interior structure. The attention calling system 500 is capable of calling the operator's attention by informing directions of objects in the entire area surrounding the vehicle 100, which can be visually recognized by the operator.

The attention calling unit 514 of the attention calling system 500 generates sounds to be output through the in-vehicle speaker 142 to notify the operator of the object orientation in addition to the visual display. The attention calling system 500 is capable of calling the operator's attention to the object by appealing to both acoustic sense and visual sense.

The front light projection device 122, the transverse light projection device 504, and the rear light projection device 506 output the visual display VI by projecting the predetermined-shaped light onto the interior structure such as the windshield 105. The attention calling system 500 implements the visual display in the mode which allows the operator to make an instinctive confirmation.

In the attention calling system 500, the windshield 105, the left door glass 158, the right door glass 160, and/or the rear glass 162 of the vehicle 100 serve as the interior structures on which the visual displays VI are displayed by the front light projection device 122, the transverse light projection device 504, and the rear light projection device 506. The front ventilation window of the vehicle 100, if any, is also allowed to serve as the interior structure. That is, the attention calling system 500 is configured to output the visual display onto the interior structure through which the outside of the vehicle 100 can be visually recognized. It is possible to call the operator's attention to the object, and implement the immediate visual recognition of the object.

In the attention calling system 500, the front light projection device 122 is configured to output the visual display VI by projecting the predetermined-shaped light onto the windshield 105. The attention calling system 500 displays the visual display indicating the object direction at least on the windshield 105, which is overlaid with the scene of the vehicle front requiring the operator's highest attention. This makes it possible to call the operator's attention effectively to the object requiring the special attention upon operation of the vehicle 100.

The front light projection device 122 for outputting the visual display VI onto the windshield 105 includes multiple light sources arranged below the windshield 105 along the horizontal direction (vehicle width direction). This allows the front light projection device for outputting the visual display VI onto the windshield 105 to be simply configured.

In the attention calling system 500, the object radar display 520 as the ring-shaped display on the HUD 156 notifies the operator of existence of the object in the entire circumferential area of the vehicle 100, which includes the blind spot areas. The attention calling system 500 allows the operator to easily confirm the objects existing in the entire circumferential area of the vehicle 100 at a time by means of the ring-shaped display as well as the condition of the entire area surrounding the vehicle 100.

The object radar display 520 displays the visual display AD indicating the object direction in the mode adapted to the probability of the object to come into contact with the vehicle 100. This allows the operator to visually recognize the respective objects with priority in accordance with the degree of the contact risk. It is possible to call the operator's attention to various objects existing in the environment surrounding the moving body in the mode further effective for the operator to take the operating action.

If the number of objects exceeds the given value, the object radar display 520 displays the visual display AD that extends over the entire circumference of the ring-shaped display 524 so that the operator's attention is not distracted by the individual objects. The attention calling system 500 allows the operator to confirm existence of the object around the vehicle 100 without distracting the operator's attention.

In the attention calling system 500, the object denotes the real object having the contact probability with the vehicle 100 equal to or higher than the given value. The attention calling system 500 narrows down the real objects that may cause the risk to the operation of the vehicle 100, and outputs the visual display indicating the direction. It is possible to call the operator's attention to the object without distracting the attention.

FIG. 18 is a flowchart representing an operation procedure executed by the attention calling system 500. When the detection unit 512 as illustrated in FIG. 13 detects at least one object, the process shown in FIG. 18 is started for each of the detected objects.

Upon start of the process, the attention calling unit 514 displays the visual display VI at the horizontal position on the interior structure, which corresponds to the direction of the detected object (S400). The attention calling unit 514 displays the visual display AD indicating the direction of the detected object on the object radar display 520 of the HUD 156 (S402). As FIG. 17 illustrates, the attention calling unit 514 is allowed to display the visual display AD in the mode adapted to the probability of the object detected by the detection unit 512 to come into contact with the vehicle 100. If the number of the objects detected by the detection unit 512 is larger than the given value, the attention calling unit 514 may be configured to display the visual display AD that extends over the entire circumference of the ring-shaped display 524.

The attention calling unit 514 determines whether or not the area where the object has been detected is the center front area CFA (S404). If the area where the object has been detected is not the center front area CFA (NO in S404), sounds are output to the operator through the in-vehicle speaker 142 for object orientation (S406).

The attention calling unit 514 then determines whether or not the object has become undetected to the detection unit 512 (S408). If the object has become undetected (YES in S408), the attention calling unit 514 terminates the process.

Meanwhile, in step S404, if the area where the object has been detected is the center front area CFA (YES in S404), the attention calling unit 514 proceeds the process to step S408 without outputting the sound. If the object is detected continuously in step S408 (NO in S408), the attention calling unit 514 returns to step S400 for executing the process repeatedly.

The present invention is not limited to structures of the embodiments, but is implementable in various modes without departing from the spirit and scope of the present invention.

In the respective embodiments described above, the predetermined real object as the prospective object may be traffic infrastructure elements including a railroad crossing, a traffic signal, a traffic electric bulletin board, and a traffic sign without being limited to movable real objects such as the vehicle and the pedestrian.

The moving body installed with the attention calling system 120, 300, 400, or 500 may be an arbitrary moving body to be operated by the operator, for example, an airplane and a ship.

The technical characteristic of any one of the attention calling systems 120, 300, 400, and 500 may be imparted to the other attention calling system. For example, it is possible to apply the characteristics to be implemented by the attention calling systems 300, 400 for displaying the visual display VI on the windshield 105 in the mode adapted to the cognition proficiency value, the risk value, and/or the reaction proficiency value to the attention calling system 500 for displaying the visual displays VI on the left door glass 158, the right door glass 160, and the rear glass 162.

The attention calling device 502 of the attention calling system 500 is provided with the behavior detection unit 306, the classification unit 308, and the cognition skill evaluation unit 310 as shown in FIG. 5, and/or the behavior detection unit 406, the risk calculation unit 412, and the reaction skill evaluation unit 410 as shown in FIG. 9 so that the visual display VI can be output in the mode adapted to the cognition proficiency value, the risk value, and/or the reaction proficiency value.

In the attention calling system 500, if the object is detected in the rearview mirror area RMA, the left fender mirror area LFMA, and the right fender mirror area RFMA as illustrated in FIG. 15, the attention calling unit 514 is allowed to output the visual display in the predetermined display range defined on mirror surfaces of the rearview mirror 110, the left fender mirror 112, and the right fender mirror 114.

In the respective embodiments, the visual display VI may have any shape without being limited to the rectangle. The visual display may be formed into a circle, an arbitrary polygon such as a triangle, or a line segment. The attention calling system 500 does not need to include three light projection devices, that is, the front light projection device 122, the transverse light projection device 504, and the rear light projection device 506. It is sufficient to provide at least one light projection device. The single light projection device may be configured to output the visual display VI to all predetermined interior structures, for example, the windshield 105, the left door glass 158, the right door glass 160, the rear glass 162, and the like.

Like the front light projection device 122, the transverse light projection device 504 and/or the rear light projection device 506 may be a light source array disposed below the left door glass 158, the right door glass 160, and the rear glass 162 for displaying the visual display.

The windshield 105, the left door glass 158, the right door glass 160, and the rear glass 162 do not need to be made of the glass material. They can be made of arbitrary material which exhibits transparency (luminous transmittance) through which the operator can visually recognize the object around the vehicle 100.

Structure Supported by Embodiments

The embodiments support the following structures.

Structure 1

The attention calling system includes the light projection device for outputting the visual display visually recognizable by the operator of the moving body on the interior structure of the moving body, and the attention calling device for controlling the light projection device to call the operator's attention to the object around the moving body by means of the visual display. The attention calling device includes the detection unit for detecting the object existing in an area surrounding the moving body, and the attention calling unit for outputting the visual display in the predetermined display range on the interior structure of the moving body by controlling the light projection device. The display range on the interior structure is the horizontally extending belt-like range orthogonal to the height direction of the moving body. The attention calling unit outputs the visual display to the horizontal position corresponding to the direction of the object seen from the position of the operator in the display range on the interior structure.

The attention calling system as the structure 1 is configured to display the visual display VI indicating direction of the object existing around the moving body seen from the operator in the horizontally extending display range on the interior structure. This makes it possible to call the operator's attention to the object existing around the moving body.

Structure 2

In the attention calling system according to the structure 1, the attention calling unit generates a sound to be output to the operator for orientation of the object through the speaker disposed inside the moving body in addition to the visual display.

The attention calling system as the structure 2 is capable of calling the operator's attention to the object by appealing to both acoustic sense and visual sense.

Structure 3

In the attention calling system according to the structure 1 or 2, the light projection device outputs the visual display by projecting predetermined-shaped light onto the interior structure.

The attention calling system as the structure 3 implements the visual display in the mode which allows the operator to make an instinctive confirmation.

Structure 4

In the attention calling system according to any one of the structures 1 to 3, the interior structure is in the form of the windshield, the front ventilation window, the door glass, and/or the rear glass of the moving body.

The attention calling system as the structure 4 is configured to output the visual display onto the interior structure through which the outside of the moving body can be visually recognized. It is possible to call the operator's attention to the object for visual recognition of the object.

Structure 5

In the attention calling system according to any one of the structures 1 to 4, at least one of the light projection devices outputs the visual display by projecting predetermined-shaped light onto the windshield of the moving body.

The attention calling system as the structure 5 is configured to display the visual display indicating the object direction, which is overlaid with the scene of the moving body front requiring the operator's highest attention. This makes it possible to effectively call the operator's attention to the object requiring the special attention upon operation of the moving body.

Structure 6

In the attention calling system according to the structure 5, the light projection device for outputting the visual display onto the windshield includes multiple light sources arranged below the windshield along a horizontal direction.

In the attention calling system as the structure 6, the light projection device for outputting the visual display onto the windshield can be simply configured.

Structure 7

In the attention calling system according to any one of the structures 1 to 6, the attention calling unit displays a ring-shaped display indicating a direction from the moving body on a display unit, and outputs the visual display to an arc part corresponding to a direction of the object.

The attention calling system as the structure 7 allows the operator to easily confirm objects existing in the entire circumferential area of the moving body at a time by means of the ring-shaped display.

Structure 8

In the attention calling system according to any one of the structures 1 to 7, the object is a real object having the probability of contact with the moving body equal to or higher than a given value.

The attention calling system as the structure 8 is configured to narrow down the real object that might cause a risk to operations of the moving body, and display the visual display indicating the direction. This makes it possible to call the operator's attention to the object without distracting the attention.

Structure 9

In the attention calling system according to the structure 8, the attention calling unit displays the visual display in the mode adapted to the probability of contact.

The attention calling system as the structure 9 allows the operator to visually recognize the respective objects with priority in accordance with the degree of contact risk. It is possible to call the operator's attention to various objects existing in the environment surrounding the moving body in the mode further effective for the operator to take the operating actions.

Structure 10

The attention calling method implemented by the computer includes the steps of detecting an object existing in an area surrounding a moving body, and outputting a visual display in the predetermined display range on the interior structure of the moving body by controlling the light projection device disposed in the moving body. The display range on the interior structure is the horizontally extending belt-like range orthogonal to the height direction of the moving body. In the step of outputting the visual display, the visual display is output to the horizontal position corresponding to the direction of the object seen from the position of the operator of the moving body in the display range on the interior structure.

The attention calling method as the structure 10 implements the attention calling system configured according to the structure 1 by allowing the computer to execute the program.

REFERENCE SIGNS LIST 100, 200, 201, 204 vehicle
102 operator's seat
103 front passenger seat
104 steering wheel
105 windshield
106 instrument panel
110 rearview mirror
112 left fender mirror
114 right fender mirror
120, 300, 400, 500 attention calling system
122 front light projection device
124, 324, 424, 502 attention calling device
130, 302, 402, 508 processor
131, 303, 403 storage unit
132, 512 detection unit
133, 304, 404, 514 attention calling unit
140 front object sensor 142 in-vehicle speaker
144 in-vehicle camera
146 brake pedal sensor
148 accelerator pedal sensor
150 rear object sensor
152 right-side object sensor
154 left-side object sensor
156 HUD
158 left door glass
160 right door glass
162 rear glass
202 motorbike
203 pedestrian
306, 406 behavior detection unit
308 classification unit
310 cognition skill evaluation unit
312 cognition proficiency information
410 reaction skill evaluation unit
412 risk calculation unit
414 reaction proficiency information
504 transverse light projection device
506 rear light projection device
520 object radar display
522 vehicle icon
524 ring-shaped display
526 arrow
HA display range
AD, AD-10, AD-12, AD-14, AD-16, AD-18, AD-20, AD-22, VI, VI-11, VI-12, VI-13, VI-14, VI-21, VI-22, VI-23, VI-24, VI-31, VI-32, VI-33, VI-34 visual display

What is claimed is:

1. An attention calling system, comprising:
a light projection device which outputs a visual display on an interior structure of a moving body, the visual display being visually recognizable by an operator of the moving body; and
an attention calling device including a processor which controls the light projection device to call the operator's attention to an object around the moving body by means of the visual display, wherein
the processor of the attention calling device functions as a detection unit for detecting the object existing in an area surrounding the moving body, and an attention calling unit for outputting the visual display in a predetermined display range on the interior structure of the moving body by controlling the light projection device,
the area surrounding the moving body is divided into a plurality of angular areas;
the plurality of angular areas includes:
a center front area which can be visually recognized by the operator seated on the operator's seat of the moving body while having a face of the operator directed forward;
a left front area and a right front area which can be visually recognized by the operator seated on the operator's seat while having the face of the operator directed leftward and rightward at approximately 45°, respectively;
a left-side area and a right-side area which can be visually recognized by the operator seated on the operator's seat while having a waist of the operator twisted leftward and rightward, respectively;
a rearview mirror area which can be visually recognized by the operator seated on the operator's seat by means of a rearview mirror of the moving body, the rearview mirror being for the operator seated on the operator's seat to visually recognize a rear view of the moving body;
a left mirror area which can be visually recognized by the operator seated on the operator's seat by means of a left mirror of the moving body, the left mirror being for the operator seated on the operator's seat to visually recognize a rear left side view of the moving body; and
a right mirror area which can be visually recognized by the operator seated on the operator's seat by means of a right mirror of the moving body, the right mirror being for the operator seated on the operator's seat to visually recognize a rear right side view of the moving body,
the predetermined display range on the interior structure at a front side of an inside of the moving body is a horizontally extending belt-like range orthogonal to a height direction of the moving body,
the attention calling unit
outputs the visual display indicating a direction of the object in the center front area, the left front area, and the right front area, which have been detected by the detection unit, to a horizontal position corresponding to the direction of the object seen from a position of the operator in the predetermined display range on the interior structure at the front side,
outputs the visual display indicating the direction of the object in the left-side area and the right-side area, which has been detected by the detection unit, on the interior structure at left and right sides of the inside, respectively, the interior structure at the left and right sides being a separate body from the interior structure at the front side, and
outputs the visual display indicating the direction of the object in the rearview mirror area, the left mirror area, and the right mirror area, which has been detected by the detection unit, on the interior structure at a rear side of the inside.

2. The attention calling system according to claim 1, wherein the attention calling unit generates a sound to be output to the operator for orientation of the object through a speaker disposed inside the moving body in addition to the visual display.

3. The attention calling system according to claim 2, wherein the attention calling unit determines whether or not the area where the object has been detected is the center front area, if the area where the object has been detected is not the center front area, the sound is output to the operator through the speaker for the orientation of the object.

4. The attention calling system according to claim 1, wherein the light projection device outputs the visual display by projecting predetermined-shaped light onto the interior structure.

5. The attention calling system according to claim 1, wherein the interior structure at the front side is in the form of a windshield of the moving body, the interior structure at the left and right sides are in the form of at least one of front ventilation windows and door glasses, and the interior structure at the rear side is in the form of a rear glass of the moving body.

6. The attention calling system according to claim 1, wherein at least one of the light projection devices outputs the visual display by projecting predetermined-shaped light onto a windshield of the moving body.

7. The attention calling system according to claim 6, wherein the light projection device for outputting the visual display onto the windshield includes multiple light sources arranged below the windshield along a horizontal direction.

8. The attention calling system according to claim 1, wherein the attention calling unit displays a ring-shaped display indicating a direction from the moving body on a display unit, and outputs the visual display to an arc part corresponding to a direction of the object.

9. The attention calling system according to claim 1, wherein the object is a real object having a probability of contact with the moving body equal to or higher than a given value.

10. The attention calling system according to claim 9, wherein the attention calling unit displays the visual display in a mode adapted to the probability of contact.

11. The attention calling system according to claim 1, wherein if the object is detected in the rearview mirror area, the left mirror area, or the right mirror area, the attention calling unit outputs the visual display in the predetermined display range defined on corresponding mirror surfaces of the rearview mirror, the left mirror, or the right mirror.

12. The attention calling system according to claim 1, wherein the left mirror is a left fender mirror or a left door mirror of the moving body, and the right mirror is a right fender mirror or a right door mirror of the moving body.

13. An attention calling method implemented by a computer having a processor, comprising the steps of:
- detecting an object existing in an area surrounding a moving body; and
- outputting a visual display in a predetermined display range on an interior structure of the moving body by controlling a light projection device disposed in the moving body, wherein:
- the area surrounding the moving body is divided into a plurality of angular areas;
- the plurality of angular areas include:
  - a center front area which can be visually recognized by an operator seated on an operator's seat of the moving body while having a face of the operator directed forward;
  - a left front area and a right front area which can be visually recognized by the operator seated on the operator's seat while having the face of the operator directed leftward and rightward at approximately 45°, respectively;
  - a left-side area and a right-side area which can be visually recognized by the operator seated on the operator's seat while having a waist of the operator twisted leftward and rightward, respectively;
  - a rearview mirror area which can be visually recognized by the operator seated on the operator's seat by means of a rearview mirror of the moving body, the rearview mirror being for the operator seated on the operator's seat to visually recognize a rear view of the moving body;
  - a left mirror area which can be visually recognized by the operator seated on the operator's seat by means of a left mirror of the moving body, the left mirror being for the operator seated on the operator's seat to visually recognize a rear left side view of the moving body; and
  - a right mirror area which can be visually recognized by the operator seated on the operator's seat by means of a right mirror of the moving body, the right mirror being for the operator seated on the operator's seat to visually recognize a rear right side view of the moving body;
- the predetermined display range on the interior structure at a front side of an inside of the moving body is a horizontally extending belt-like range orthogonal to a height direction of the moving body;
- in the step of outputting the visual display,
- the visual display indicating a direction of the object in the center front area, the left front area, and the right front area, which has been detected is output to a horizontal position corresponding to the direction of the object seen from a position of the operator of the moving body in the predetermined display range on the interior structure at the front side,
- the visual display indicating the direction of the object in the left-side area and the right-side area, which has been detected is output on the interior structure at left and right sides of the inside, respectively, the interior structure at the left and right sides being a separate body from the interior structure at the front side, and
- the visual display indicating the direction of the object in the rearview mirror area, the left mirror area, and the right mirror area, which has been detected is output on the interior structure at a rear side of the inside.

* * * * *